(12) United States Patent
Stojanovic et al.

(10) Patent No.: US 11,025,405 B2
(45) Date of Patent: Jun. 1, 2021

(54) HIGH CAPACITY OPTICAL DATA TRANSMISSION USING INTENSITY-MODULATION AND DIRECT-DETECTION

(71) Applicant: HUAWEI TECHNOLOGIES CO., LTD., Guangdong (CN)

(72) Inventors: Nebojsa Stojanovic, Munich (DE); Changsong Xie, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/247,368

(22) Filed: Jan. 14, 2019

(65) Prior Publication Data
US 2019/0165926 A1    May 30, 2019

Related U.S. Application Data

(63) Continuation of application No. PCT/EP2016/066932, filed on Jul. 15, 2016.

(51) Int. Cl.
*H04L 7/00* (2006.01)
*H04B 10/69* (2013.01)
(Continued)

(52) U.S. Cl.
CPC ........... *H04L 7/0029* (2013.01); *H04B 10/54* (2013.01); *H04B 10/61* (2013.01); *H04B 10/69* (2013.01);
(Continued)

(58) Field of Classification Search
CPC ............. H04L 1/0045; H04L 25/03885; H04L 7/0029; H04L 7/005; H04L 7/0075;
(Continued)

(56) References Cited

U.S. PATENT DOCUMENTS 6,177,835 B1 * 1/2001 Grebowsky ......... H04L 27/2332
329/304
6,621,862 B1 * 9/2003 Dabell .............. H04L 25/03038
375/229
(Continued)

FOREIGN PATENT DOCUMENTS

CN    104243039 A    12/2014
EP    2615769 B1    4/2018
(Continued)

OTHER PUBLICATIONS

Goeger et al ; Transmission of Intensity modulation-direct detection signals far beyond the dispersion limit enabled by phase-retrieval; IEEE; 2015. (Year: 2015).*
(Continued)

*Primary Examiner* — Amritbir K Sandhu
(74) *Attorney, Agent, or Firm* — Womble Bond Dickinson (US) LLP

(57) ABSTRACT

The present invention relates to a multi-channel IM-DD optical transceiver comprising at least one transmitter and a receiver, and a method for equalizing input samples at an adjusted sampling phase using a quality parameter linearly proportional to a BER. The data transmission and reception use a single master channel and slave channels, which have a baud rate equal to or lower than the baud rate of the master channel. A reliable and identical clocking of all the channels is obtained through either the receiver clock of the master channel when they are received from a single transmitter or a reference clock whose frequency is higher than the highest clock frequency amongst all the channels when they are received from a combination of transmitters. An enhanced timing recovery circuit is also provided to select optimized finite impulse response filters, calculate filter coefficients and generate the receiver clock of the master channel.

9 Claims, 18 Drawing Sheets

(51) Int. Cl.
  *H04J 14/02* (2006.01)
  *H04B 10/54* (2013.01)
  *H04B 10/61* (2013.01)
  *H04L 1/00* (2006.01)
  *H04L 25/03* (2006.01)

(52) U.S. Cl.
  CPC ........ *H04B 10/697* (2013.01); *H04J 14/0224* (2013.01); *H04L 1/0045* (2013.01); *H04L 7/0075* (2013.01); *H04L 25/03885* (2013.01); *H04J 14/02* (2013.01); *H04L 7/005* (2013.01)

(58) Field of Classification Search
  CPC ...... H04B 10/61; H04B 10/69; H04B 10/697; H04B 10/54; H04J 14/02; H04J 14/0224
  USPC .................................. 398/202–214, 135–139
  See application file for complete search history.

(56) References Cited

U.S. PATENT DOCUMENTS

| | | | |
|---|---|---|---|
| 7,466,251 B2* | 12/2008 | Uchino | H03M 1/0624 341/120 |
| 7,706,434 B1* | 4/2010 | Farjadrad | H04B 3/32 375/222 |
| 7,738,602 B2 | 6/2010 | Langenbach et al. | |
| 8,538,272 B1* | 9/2013 | Robinson | H04B 10/2543 398/158 |
| 9,071,364 B1* | 6/2015 | Voois | H04B 10/2507 |
| 9,209,900 B2* | 12/2015 | Cai | H04B 10/2572 |
| 9,337,934 B1 | 5/2016 | Agazzi et al. | |
| 9,337,937 B2* | 5/2016 | Duthel | H04B 10/616 |
| 10,057,012 B2* | 8/2018 | Ge | H04L 1/007 |
| 2002/0039394 A1* | 4/2002 | Buchwald | H03L 7/0816 375/355 |
| 2002/0138229 A1* | 9/2002 | Wilborn | G01S 11/02 702/142 |
| 2008/0107422 A1* | 5/2008 | Cole | H03M 9/00 398/135 |
| 2010/0105339 A1* | 4/2010 | Ganger | H03H 11/126 455/75 |
| 2011/0097092 A1* | 4/2011 | Wagner | H04B 10/65 398/202 |
| 2012/0141116 A1* | 6/2012 | Zeng | H04J 3/14 398/1 |
| 2013/0022351 A1* | 1/2013 | Arikawa | H04L 7/0075 398/25 |
| 2014/0369684 A1 | 12/2014 | Cai | |
| 2020/0138229 A1* | 5/2020 | Kweon | A47J 27/04 |

FOREIGN PATENT DOCUMENTS

| | | | | |
|---|---|---|---|---|
| WO | 2016012036 A1 | 1/2016 | | |
| WO | WO-2016012036 A1 * | 1/2016 | | H03L 7/235 |

OTHER PUBLICATIONS

Goeger et al; Transmission of Intensity modulation-direct detection signals Far beyond the dispersion limit enabled by phase retrieval; 2015; European research center; pp. 1-3. (Year: 2015).*

* cited by examiner

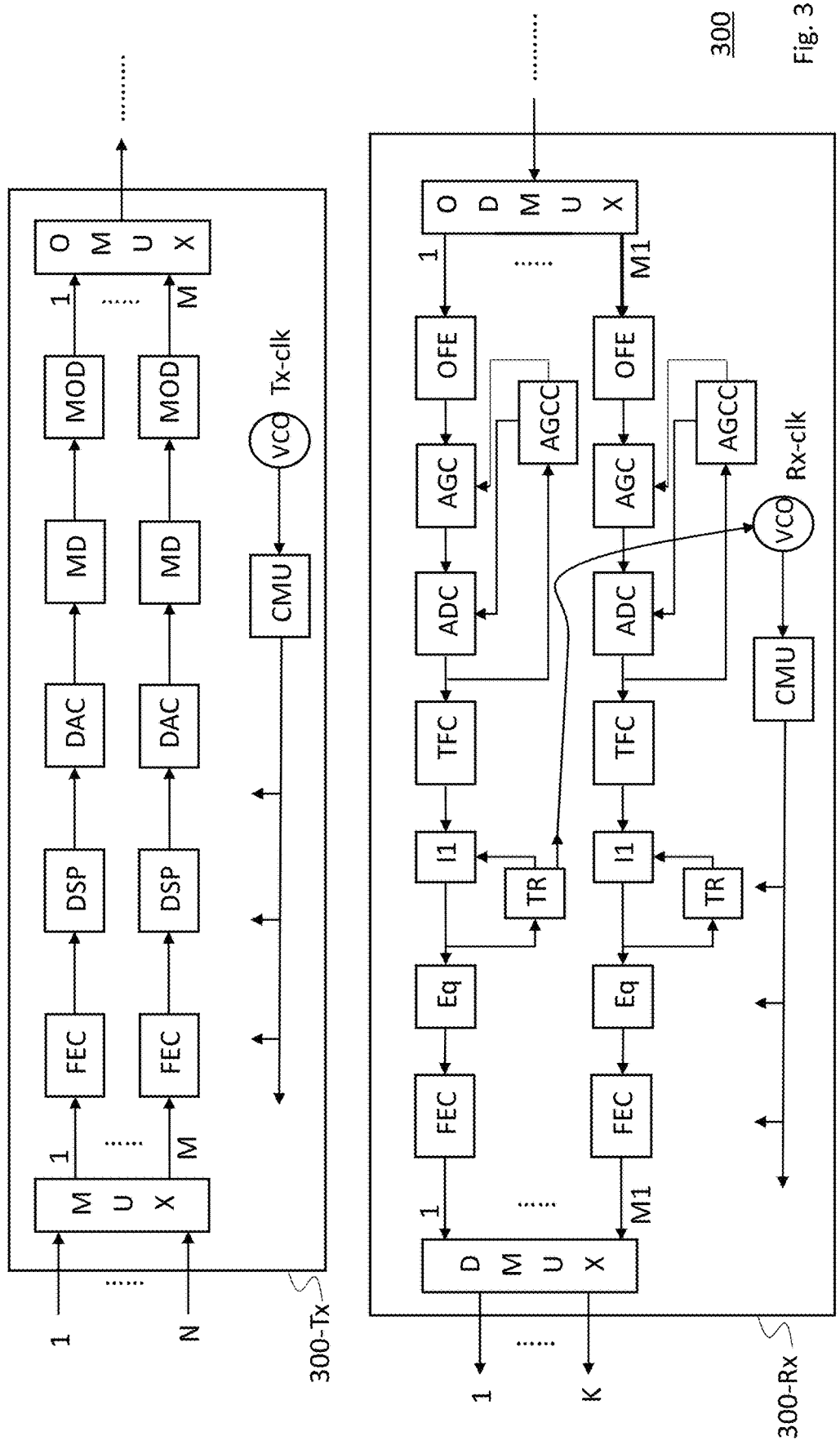

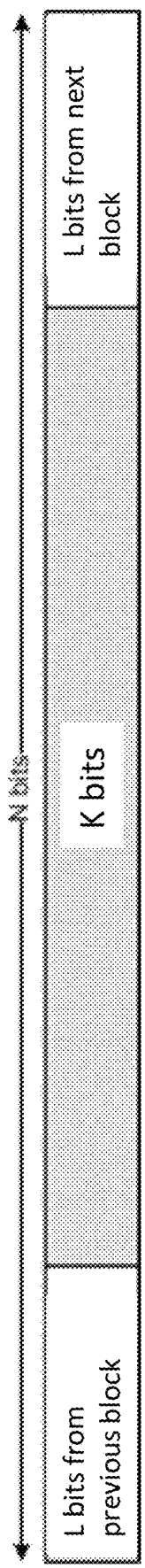
Fig. 13a
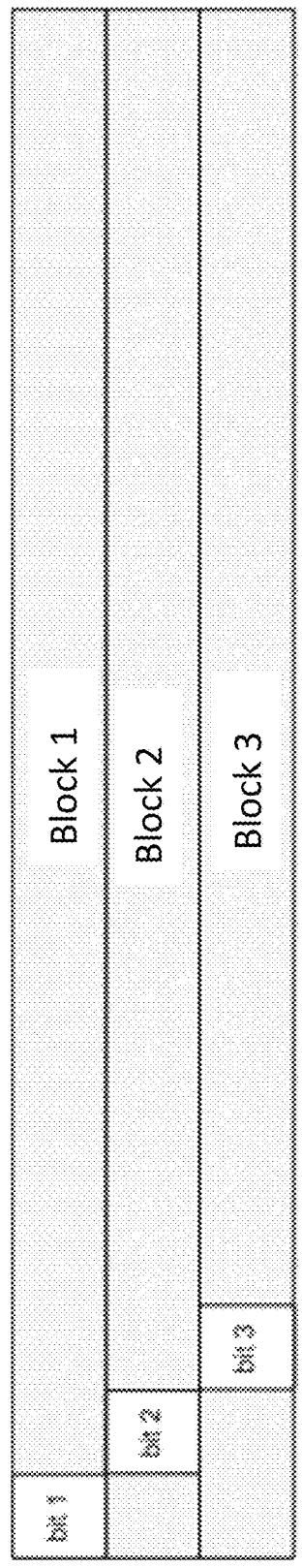 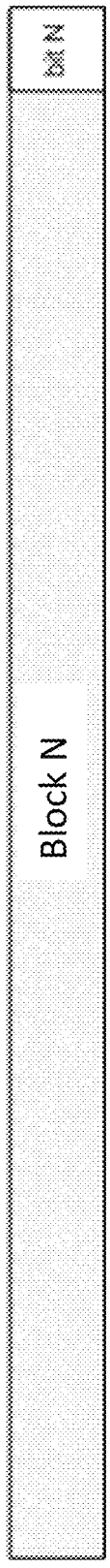
Fig. 13b

HIGH CAPACITY OPTICAL DATA TRANSMISSION USING INTENSITY-MODULATION AND DIRECT-DETECTION

CROSS-REFERENCE TO RELATED APPLICATIONS

This application is a continuation of International Application No. PCT/EP2016/066932, filed on Jul. 15, 2016, the disclosure of which is hereby incorporated by reference in its entirety.

TECHNICAL FIELD

Embodiment of the invention relate to the field of optical transmission systems, and more particularly to an intensity-modulation and direct-detection optical receiver.

BACKGROUND

Owing to advances in optical and electrical components design, the capacity of optical links has significantly increased. Using complex modulation formats, both principal states of polarization and coherent detection, it is possible to transmit 100 Gb/s data over long haul optical networks of more than 2000 km in commercial applications. By comparison with the traditional non-coherent 10 Gb/s transmission, it results in a ten times traffic increase. But in return, the coherent systems use much more expensive devices and advanced signal processing, which also leads to increasing power consumption. Nevertheless, since the massive component production has become more mature, the price of the 100G-coherent transponders has dropped to such an extent that using one 100G transponder is nowadays more profitable, for example in terms of price and size, than deploying ten 10G transponders.

Coherent devices are equipped with an enhanced digital signal processor (DSP), which is not fully exploited in short transmission applications. The implementation of such an enhanced DSP is however onerous and highly energy-intensive, such that most carriers have turned to cheaper high capacity solutions. So, a high level of integration, cheap devices and a sophisticated DSP have attracted growing interest, and intensity-modulation and direct-detection (IM-DD) systems seem to be the most promising candidates because their transmitter and receiver cost is much less compared with the price of coherent systems. Modern coherent systems use high bandwidth components and can efficiently compensate for chromatic dispersion (CD) and polarization mode dispersion (PMD). Unlike the coherent systems, the non-coherent systems can be used in very limited applications when the wavelengths carrying the information are selected within the standard third window (i.e., wavelength band between 1510 nm and 1600 nm), and are deployed in dispersion-compensated links. Chromatic dispersion (CD) in that third window is often compensated using a combination of fibers with opposite signs of chromatic dispersion. More specifically, the chromatic dispersion compensation can be made by adding a length of fiber with a negative chromatic dispersion at a wavelength band to a system containing a fiber with a positive dispersion in that band. However, the conventional optical fibers have a dispersion coefficient close to 16 ps/(nm*km) and the dispersion compensating fibers (DCFs) are normally shorter than one optical span (approximate length of 80 km) and have a higher dispersion coefficient. In addition, using DCFs causes some negative effects, such as higher noise, nonlinear effects and need of higher power. So, the biggest challenge in non-coherent systems is to extract clock from severely distorted optical channels and to detect data. Without enhanced architecture and DSP, that is only possible in short optical links and also strongly depends on the baud rate.

Thus, it is preferred to use cheaper techniques to transmit high baud rate data in short optical links without dispersion compensating fibers. Nevertheless, the main problem in such systems is the phenomenon of dispersion, such as modal dispersion (MD), chromatic dispersion (CD) and polarization mode dispersion (PMD), whose overall effect on the performance of the optical fiber is known as inter-symbol interference (ISI), which degrades not only the quality and the performance of the signal but also the quality of the extracted clock tone.

At the transmitter side, several cheap techniques for transmitting 10 Gb/s data over optical links without dispersion compensating fibers include on-off keying (OOK) technique, duo-binary transmission or chirp-managed directly modulated laser (CML) technique, the OOK technique being the cheapest but providing the poorest performance in longer links.

At the receiver side, in optical links without dispersion compensating fibers, the signal suffering from the phenomenon of dispersion must be equalized. The receiver may use feed-forward equalizer (FFE), decision feedback equalizer (DFE), maximum likelihood sequence estimator (MLSE) or a combination thereof. However, FFE suffers from noise enhancement and DFE from error multiplication, while MLSE represents the best and costliest solution.

FIG. 1 shows a conventional direct detection 10 Gb/s optical transmission system 100. At the transmitter side, the data are amplified through a modulator driver (MD). The amplified data modulate a distributed feedback (DFB) laser signal by an electro-absorption modulator (EAM), which are usually integrated in transmit optical subassemblies (TOSA). The modulated optical signal is afterwards transmitted over several spans consisting individually of fiber and erbium-doped fiber amplifier (EDFA) towards an optical front end (OFE) of the receiver.

At the receiver side, a PIN photodiode or an avalanche photodiode (APD) detects the optical signal and converts it to an electrical signal. The output of the photodiode (PDiode), which is proportional to the optical signal power, is then amplified through a trans-impedance amplifier (TIA), which is usually integrated together with the photodiode in receive optical subassemblies (ROSA). The amplified electrical signal may afterwards be transmitted towards an automatic gain control circuit (AGC) to be adjusted to the input of an analog-to-digital converter (ADC) when electronic equalization is used. The AGC monitors signal power variations and produces an almost constant signal swing that fits into the ADC input range. Indeed, to prevent the signals suffering from chromatic dispersion from being clipped, it is preferable to have rather large signals, which leads to a selective ADC input range. After converting from an analog to a digital domain through the analog-to-digital converter, the resulting digital signal that suffers from noise and inter-symbol interference is received at an equalizer (Eq), such as a MLSE equalizer.

However, before activating the equalizer, the local oscillator, i.e., the receiver oscillator, must be locked to the transmitter oscillator responsible for data clocking. More specifically, those two oscillators must be synchronized while allowing small deviations, since it is impossible to perfectly track the transmitter clock source. To this extent, a digital signal that contains a timing information is provided to a phase detector (PD) (e.g., a Mueller-Muller phase detector (MMPD), an Alexander phase detector (APD), or a Gardner phase detector (GPD)) within a timing recovery (TR) circuit. The clock extraction is then carried out using the phase detector, which outputs the timing information about whether the sampling clock is higher or lower. Since that information is noisy due to pattern-dependent noise, noise caused by amplifiers and other component imperfections, it must be filtered through a filter (e.g., a proportional-integral (PI) filter) within the timing recovery circuit before entering the receiver oscillator (e.g., a voltage-controlled oscillator (VCO)).

Furthermore, the clock phase of the receiver oscillator can be adjusted using a sampling phase adjustment (SPA) circuit. The sampling phase of the SPA can be controlled and optimally adjusted through a forward error correction (FEC) by seeking to minimize the number of FEC input errors, the best sampling phase being the one that minimizes the bit error rate (BER).

Nevertheless, such a timing recovery circuit remains strongly influenced by the inter-symbol interference (ISI) related to high chromatic dispersion, which degrades not only the quality and the performance of the signal but also the quality of the clock tone extracted by the timing recovery circuit. In particular, this problem is more serious than using some equalization techniques to cope with ISI. For example, in 10 Gb/s OOK systems, the MLSE equalizer can equalize a signal from 300 km link while the clock tone of most conventional phase detectors disappears after 100 km. Thus, at the receiver side, the clock must be first extracted and then one equalizes the digital signal. In addition, a huge ISI generates a large jitter and the receivers are extremely prone to symbol slips.

FIG. 2 shows a conventional direct-detection receiver 200 comprising a MLSE equalizer. The MLSE equalizer provides the best performance among all the aforementioned equalization techniques. This is achieved using very complex and energy-intensive algorithms. The complexity depends on the signal spreading and the resulting ISI to be equalized. Normally, the Viterbi algorithm is used in a MLSE architecture. The MLSE complexity grows exponentially with the channel memory, which must be equal to the number of symbol intervals over which there is an isolated symbol spread if one wants to achieve the best equalizer performance. There are two kinds of method for updating metrics in the MLSE engine: blind and training.

The training method uses a known symbol sequence to estimate channel conditions. That introduces an additional redundancy and requires enhanced synchronization algorithms. However, in severely distorted channels, the use of training symbols is impractical and the blind method is then preferable.

The blind method uses a well-designed starting channel model from which the MLSE equalizer roughly equalizes the distorted signal. Even though the output BER is not satisfactory, the erroneous decoded bits can still be used to further improve the MLSE channel model (metrics). After several channel model updates, a channel model (CM) unit delivers the metrics for the MLSE equalizer, which enables almost the optimum performance. The branch metric calculation (BMC) through the CM unit can be based on histograms or mean values. In the histogram-based method, a probability density function (pdf) for each symbol pattern is estimated and the logarithm of pdf is then used to calculate the branch metrics. In the mean value-based method, all noise distributions are assumed to be normal with the same variance and the branch metrics are calculated based on a simple Euclidian distance.

SUMMARY

Embodiments of the present invention are to provide an apparatus for receiving data signals in a multi-channel optical transceiver, a system for transmitting and receiving data signals in a multi-channel optical transceiver and a method for equalizing input samples at an adjusted sampling phase in a receiver of a multi-channel optical transceiver, in which an enhanced clock extraction from a noisy and dispersive optical signal can be performed in extremely bandwidth-limited systems with respect to the Nyquist frequency and an equalizer performance can be optimally obtained using simple algorithms.

According to a first aspect, an embodiment of the invention relates to an apparatus for receiving data signals in a multi-channel optical transceiver, the apparatus comprising a receiver adapted to process data signals of a plurality of M1 channels received from a plurality of M channels of a single transmitter or a combination of transmitters, each channel having a respective baud rate, wherein the receiver has a single master channel, the remaining channels being slave channels, the master channel of the receiver is the channel that has the highest baud rate amongst the plurality of M1 channels, the slave channels having a baud rate equal to or lower than the highest baud rate of the master channel, and each channel of the receiver amongst the master channel and the slave channels comprises a timing recovery circuit adapted to control a sampling phase of a first interpolator.

Thereby, a flexible data reception using master and slave channels can be carried out. The plurality of M channels can be multiplexed by an optical multiplexer and the plurality of M1 channels can be de-multiplexed by an optical de-multiplexer. In order to have at the receiver the number of M1 channels received from a plurality of M channels of a single transmitter or a combination of transmitters equal to or lower than the number of M channels, a reconfigurable optical add-drop multiplexer can be provided to connect the optical multiplexer and the optical de-multiplexer.

According to one embodiment, the timing recovery circuit comprises, when the plurality of M1 channels is received from a plurality of M channels of a single transmitter, a first apparatus adapted in a first phase to obtain a first timing control signal in order to control a phase and frequency of an oscillator of the master channel, a selection unit adapted in a second phase following the first phase to select a first and second finite impulse response filter amongst a plurality of selectable finite impulse response filters and to calculate the coefficients of a first and second filter in order to obtain an adjusted first and second filter, and a second apparatus adapted in a third phase following the second phase to obtain the sampling phase of the first interpolator using the selected first and second finite impulse response filters and the adjusted first filter, and to obtain a second timing control signal using the selected first and second finite impulse response filters and the adjusted first and second filters in order to control the phase and frequency of the oscillator of the master channel.

Thereby, the timing recovery circuit of the master channel can control both the sampling phase of the first interpolator and also the phase and frequency of the oscillator, such that a reliable clocking of the master channel can be obtained.

According to one embodiment, the plurality of M1 channels is controlled by an identical clock signal generated by the oscillator of the master channel.

Thereby, a reliable clocking of all the channels can be obtained through the oscillator of the master channel. In addition, that clocking allows to save several oscillators since only one oscillator, namely the oscillator of the master channel, is used.

According to one embodiment, the timing recovery circuit comprises, when the plurality of M1 channels is received from a plurality of M channels of the combination of transmitters, a selection unit adapted in a phase to select a first and second finite impulse response filter amongst a plurality of selectable finite impulse response filters and to calculate the coefficients of a first and second filter in order to obtain an adjusted first and second filter, and an apparatus adapted in a subsequent phase to obtain the sampling phase of the first interpolator using the selected first and second finite impulse response filters and the adjusted first filter.

Thereby, each channel of the receiver can individually and separately control the sampling phase of its respective first interpolator. The sampling phase control can be carried out by estimating and compensating for a phase jitter.

According to one embodiment, the plurality of M1 channels is controlled by an identical clock signal as a reference clock signal, the reference clock signal being generated to have a higher frequency than the highest frequency of each clock signal amongst the plurality of M1 channels.

Thereby, a reliable clocking of all the channels can be carried out through a single reference clock, which will be higher than any other data clock received from all the channels. Thus, each channel of the receiver has a respective timing recovery circuit operating only in an "inner" feedback loop to track the fast signal phase variations.

According to one embodiment, each channel of the receiver comprises an automatic gain control device adapted to adjust an analog data signal to the input of an analog-to-digital converter through a control of a bias signal of the analog data signal and an amplitude of the analog data signal.

Thereby, an optimized gain control can be obtained to allow the analog-to-digital converter to be more efficiently used by receiving an optimally quantized signal at its input.

According to one embodiment, each channel of the receiver comprises a transfer function compensator adapted to process a digital data signal from the analog-to-digital converter by compensating for the limited bandwidth of the optical and electrical components of the multi-channel optical transceiver, the processed digital data signal being provided to an input of the first interpolator.

Thereby, the performance degradation, which results from a limited spectrum of the received signal due to the limited bandwidth of the optical and electrical components and the connections, can be compensated or mitigated. Furthermore, the transfer function compensator of the receiver can be adapted to increase the signal spectrum at medium frequencies.

According to one embodiment, each channel of the receiver comprises a maximum-likelihood sequence estimation equalizer adapted to equalize, at an adjusted sampling phase, input samples into decoded data based on a performance estimation using a quality parameter linearly proportional to a bit error rate of the output of the maximum-likelihood sequence estimation equalizer and based on a sampling phase adjustment using a probability of most critical error events.

Thereby, the sampling phase can be optimally adjusted and the performance of the maximum-likelihood sequence estimation equalizer can thus be improved. Moreover, the performance estimation can rest on the quality parameter (CMQ) rather than the bit error rate (BER), the values of CMQ and BER being linearly proportional to each other on a logarithmic scale.

According to one embodiment, the maximum-likelihood sequence estimation equalizer operates in a blind mode starting from starting channel models stored in a starting channel model list device. Thereby, no complex synchronization algorithm is required in the blind mode unlike the training mode.

According to one embodiment, the maximum-likelihood sequence estimation equalizer comprises a maximum-likelihood sequence estimation decoder adapted to decode, at the adjusted sampling phase, the input samples into the decoded data by starting with the stored starting channel model that is selected to have the lowest quality parameter, a branch metric computation device adapted to control the maximum-likelihood sequence estimation decoder and update the corresponding channel using the input samples of the maximum-likelihood sequence estimation decoder and the decoded data output from the maximum-likelihood sequence estimation decoder, a sampling phase selector adapted to determine a sampling phase estimation value at different sampling phases using the input samples of the maximum-likelihood sequence estimation decoder and the decoded data output from the maximum-likelihood sequence estimation decoder and adapted to select the sampling phase corresponding to the highest sampling phase estimation value, and a sampling phase adjustment device adapted to adjust the selected sampling phase into the adjusted sampling phase.

Thereby, an optimal sampling phase can be obtained. In a first phase corresponding to a rough sampling phase adjustment done during the acquisition, the sampling phase corresponding to the highest sampling phase estimation value is selected. In a second phase following the first phase and corresponding to a fine sampling phase adjustment done after the acquisition, the optimal sampling phase is obtained. Furthermore, the sampling phase adjustment device can comprise a second interpolator, which receives the interpolated signal output from the first interpolator, and the sampling phase selector can be embedded either partly or entirely in a microcontroller in order to reduce the complexity as the sampling phase does not experience fast variations.

According to one embodiment, each channel of the receiver comprises a forward error corrector adapted to eliminate the errors in the decoded data output from the maximum-likelihood sequence estimation decoder.

Thereby, the decoded data can be error-free data, which are then de-multiplexed using a de-multiplexer.

The above object is also solved in accordance with a second aspect.

According to the second aspect, an embodiment of the invention relates to a system for transmitting and receiving data signals in a multi-channel optical transceiver, the system comprising the apparatus according to the first aspect or any one of the embodiments of the first aspect, and the single transmitter as specified in the first aspect or the combination of transmitters as specified in any embodiment of the first aspect.

According to one embodiment, each channel amongst the plurality of M channels of the single transmitter or the combination of transmitters has a respective baud rate, each transmitter amongst the single transmitter or the combination of transmitters has a single master channel, the remaining channels of each transmitter being slave channels, and the master channel of each transmitter amongst the single transmitter or the combination of transmitters is the channel that has the highest baud rate, the slave channels having a baud rate equal to or lower than the highest baud rate of the master channel.

Furthermore, each channel of the single transmitter or the combination of transmitters can comprise a transfer function compensator adapted to process a digital data signal by compensating for the limited bandwidth of the optical and electrical components of the multi-channel optical transceiver.

Moreover, the transfer function compensator of the single transmitter or the combination of transmitters can be adapted to increase the signal spectrum at high frequencies.

The above object is also solved in accordance with a third aspect.

According to the third aspect, an embodiment of the invention relates to a method for equalizing input samples at an adjusted sampling phase in a receiver of a multi-channel optical transceiver, the method comprising estimating a performance of a maximum-likelihood sequence estimation equalizer using a quality parameter linearly proportional to a bit error rate of the output of a maximum-likelihood sequence estimation decoder of the maximum-likelihood sequence estimation equalizer, the maximum-likelihood sequence estimation equalizer operating in a blind mode starting from a plurality of starting channel models stored in a starting channel model list device, performing a first sampling phase adjustment in order to select the sampling phase corresponding to the highest sampling phase estimation value, and performing a second sampling phase adjustment in order to adjust the selected sampling phase into an adjusted sampling phase.

The above object is also solved in accordance with a fourth aspect.

According to the fourth aspect, an embodiment of the invention relates to a computer program comprising program code for performing the method according to the third aspect when executed on a computer.

Thereby, the method can be performed in an automatic and repeatable manner.

The computer program can be performed by any one of the apparatuses. The apparatuses can be programmably arranged to perform the computer program.

Embodiments of the invention can be implemented in hardware, software or in any combination thereof.

It shall further be understood that a preferred embodiment of the invention can also be any combination of the dependent claims or above embodiments with the respective independent claim. These and other aspects of the invention will be apparent and elucidated with reference to the embodiments described hereinafter.

BRIEF DESCRIPTION OF THE DRAWINGS

In the following detailed portion of the present disclosure, the invention will be explained in more detail with reference to the exemplary embodiments shown in the drawings, in which:

FIG. 3 shows a multi-channel intensity-modulation direct-detection (IM-DD) transceiver according to a first embodiment of the present invention;

FIG. 13a and FIG. 13b are a show a basic decoding block (FIG. 13a) and a decoding block of the MLSE decoder (FIG. 13b) according to an eleventh embodiment of the present invention;

Identical reference signs are used for identical or at least functionally equivalent features.

DETAILED DESCRIPTION OF EMBODIMENTS OF THE INVENTION

FIG. 3 shows a multi-channel IM-DD transceiver 300 comprising a multi-channel transmitter 300-Tx and a multi-channel receiver 300-Rx according to a first embodiment of the present invention.

The multi-channel transmitter 300-Tx comprises N channels (numbered from 1 to N) with different or equal bit rates, which are multiplexed through a multiplexer (MUX) into M channels (numbered from 1 to M), which may not have the same bit rates. Each one amongst the M channels comprises a forward error correction (FEC) device, a digital signal processing (DSP) device, a digital-to-analog converter (DAC), a modulator driver (MD) and an optical modulator (MOD), respectively.

The channel amongst the M channels having the highest baud rate (fBmax) is denoted as a master channel, which corresponds to the channel 1 in the first embodiment, and the remaining channels having a baud rate (fBi) equal to or lower than fBmax are denoted as the slave channels. The slave channels have a baud rate fBi given by the following equation (1):

$$fBi=(k+\Delta)*fBmax \quad (1)$$

where the deviation $\Delta$ from the rational number k is small (e.g., $10^{-4}$), and k is a rational number less than unity when $\Delta \neq 0$ and equal to unity when $\Delta=0$.

Each channel is protected by a respective FEC device, the overhead of which may be different for each channel.

Each respective transmitter DSP (Tx DSP) device performs a bit mapping into PAM-n format, where n can be any integer number and, therefore, not necessarily a power of two, and forms signal shapes with samples at a frequency fs given by the following equation (2):

$$fs=m*fBmax \quad (2)$$

where m>1.

Furthermore, each Tx DSP comprises a respective transfer function compensation (TFC) device compensating for the limited bandwidth of the electrical and optical components of the multi-channel transmitter 300-Tx.

The DAC input receives the digital signal processed by the Tx DSP, whereas the DAC output is transmitted towards a modulator driver (MD).

The MD amplifies the analog signal output from the DAC, which is then modulated into an optical signal through an optical modulator (MOD), which comprises a distributed feedback (DFB) laser and an electro-absorption modulator (EAM).

The M optical signals are then multiplexed by an optical multiplexer (OMUX) into a multicarrier optical signal, which is transmitted over an optical path having several spans consisting individually of a fiber and an erbium-doped fiber amplifier (EDFA). By propagating through the optical path, the multicarrier optical signal suffers from the fiber (CD, PMD, nonlinear effects, optical filtering) and amplifier (optical noise, non-linearity) imperfections.

Figure 1:
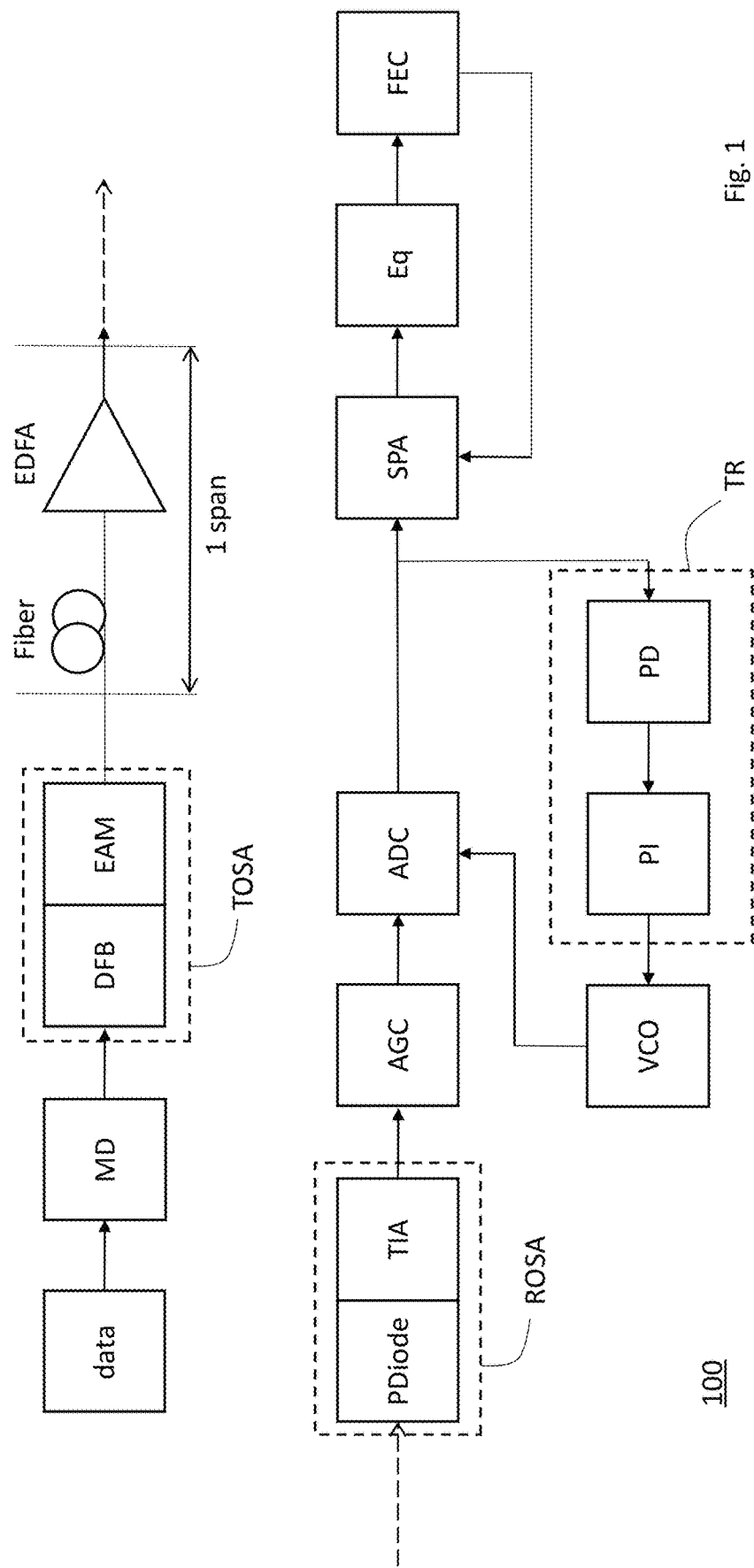
FIG. 1 shows a conventional direct detection 10 Gb/s optical transmission system.
Figure 2:
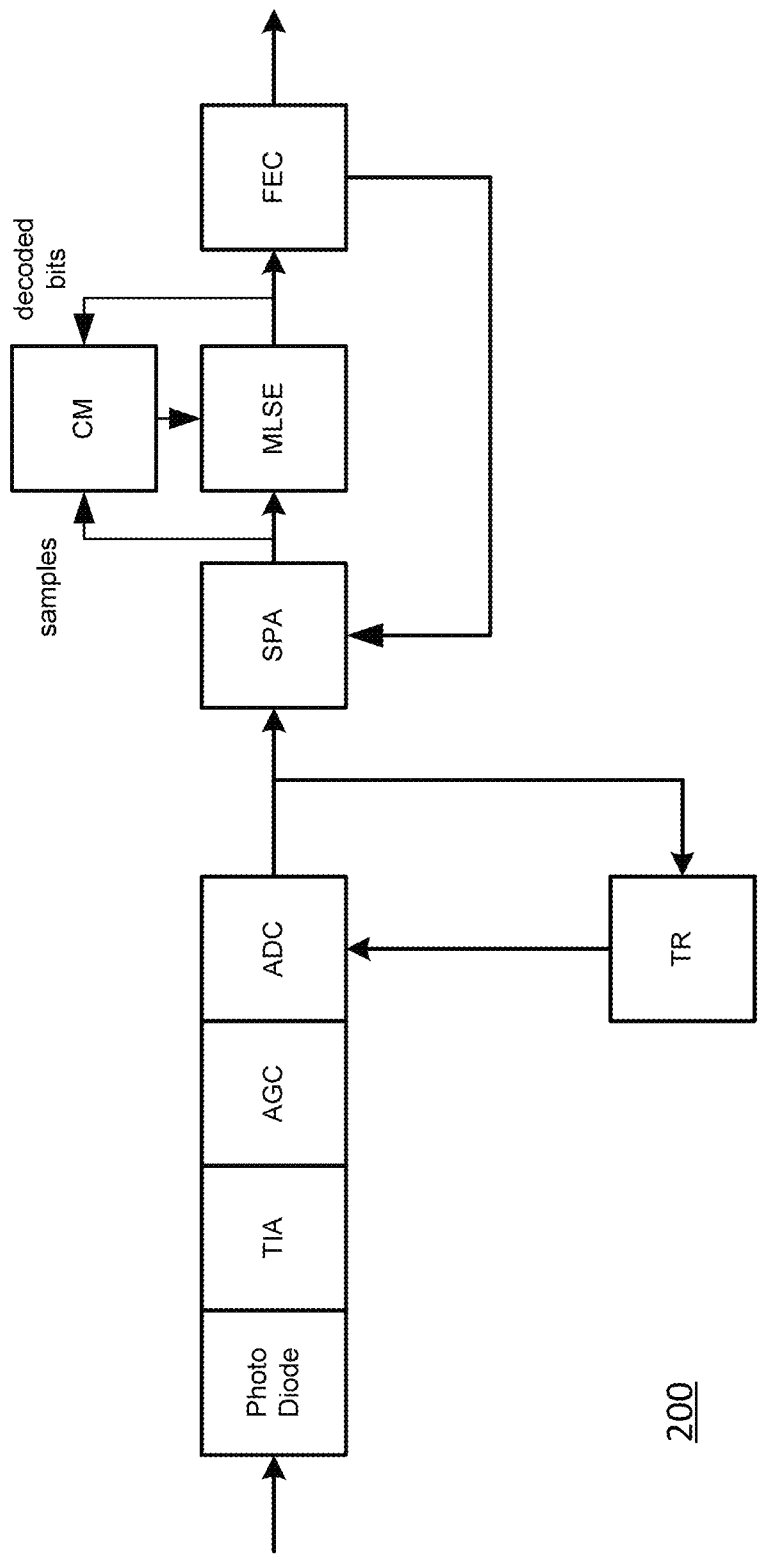
FIG. 2 shows a conventional direct-detection receiver comprising a MLSE equalizer.
Figure 4B:
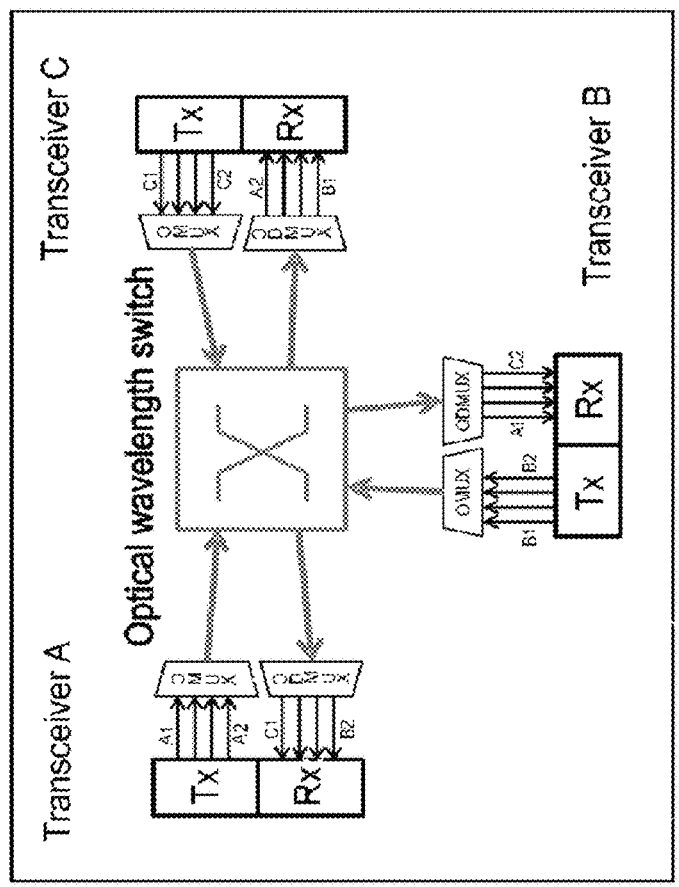
FIG. 4a and FIG. 4b are shows an optical wavelength switch connecting together an optical multiplexer at the transmitter side and an optical de-multiplexer at the receiver side and being implemented either in a fixed-run mode (FIG. 4a) or in a free-run mode (FIG. 4b) according to a second embodiment of the present invention.
Figure 4A:
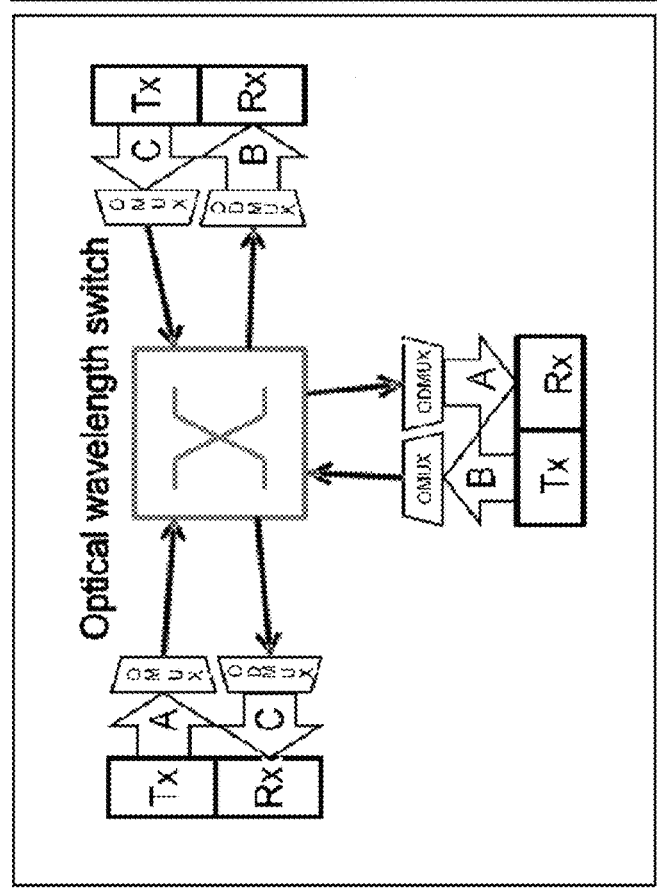

FIG. 4a and FIG. 4b show an optical wavelength switch connecting together an optical multiplexer (OMUX) at the transmitter side and an optical de-multiplexer (ODMUX) at the receiver side and being implemented either in a fixed-run mode (FIG. 4a) or in a free-run mode (FIG. 4b) according to a second embodiment of the present invention.

As shown in FIG. 4a when in the fixed-run mode, the received multiplexed optical signals at the receiver come from the same multi-channel transmitter. As shown in FIG. 4b when in the free-run mode, the received multiplexed optical signals at the receiver come from a plurality of different multi-channel transmitters. In both modes, the number of received multiplexed optical signals can be equal to or less than M. That can be rendered possible by the provision of the optical wavelength switch, such as a reconfigurable optical add-drop multiplexer (ROADM), as depicted in FIG. 4a and FIG. 4b. Thus, a combination of M1 optical signals with M1≤M is possible at the receiver input.

As depicted in FIG. 3, the M1 optical signals (numbered from 1 to M1) are then de-multiplexed by the optical de-multiplexer (ODMUX) and detected by a respective optical front end (OFE) adapted to convert the respective de-multiplexed optical signal to an electrical signal.

FIG. 3 shows the multi-channel receiver 300-Rx adapted to work in a fixed-run mode by receiving multiplexed optical signals coming from the same multi-channel transmitter 300-Tx. The channel amongst the M1 channels of the multi-channel receiver 300-Rx having the highest baud rate (fBmax) is the master channel, and the remaining channels having a baud rate (fBi) equal to or lower than fBmax are the slave channels. As illustrated, the master channel corresponds in our exemplary embodiment to the channel 1 and the slave channels correspond to the remaining channels from 2 to M1.

Before sending towards an input of a respective analog-to-digital converter (ADC), each electrical signal is first adjusted through a respective automatic gain control (AGC) array under control of a respective AGC control (AGCC) device. Instead of eliminating the DC component and adjusting the electrical signal by controlling its power or its root mean square (rms) value, as conventionally made, the AGC array of FIG. 3 is rather adapted to vary the DC component and swing of the electrical signal in order to optimally use the ADC.

Figure 5C:
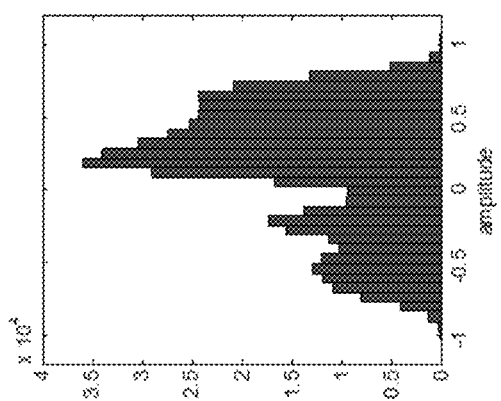
FIG. 5a and FIG. 5b and FIG. 5c are a show three histogram plots of an AGC output signal y as a function of an AGC input signal amplitude x, when y=x (FIG. 5a) and y=1.3x (FIG. 5b), and when y=1.3x+0.15 according to a third embodiment of the present invention (FIG. 5c)
Figure 5B:
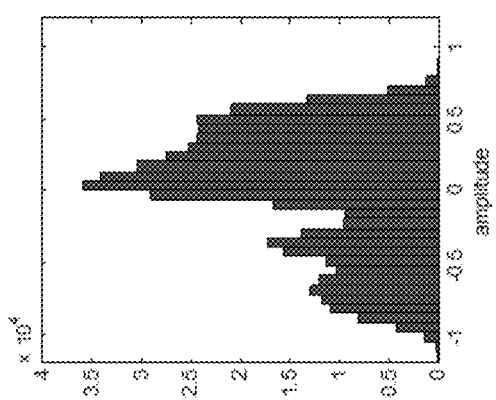
Figure 5A:
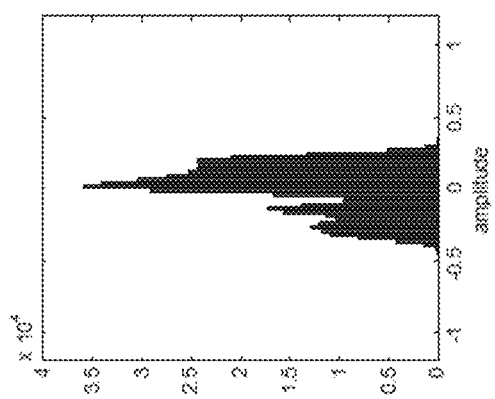

FIG. 5a and FIG. 5b and FIG. 5c show three histogram plots of an AGC output signal y as a function of an AGC input signal amplitude x, when y=x (FIG. 5a) and y=1.3x (FIG. 5b), and when y=1.3x+0.15 according to the third embodiment of the present invention (FIG. 5c), wherein the AGC input signal amplitudes x are grouped into a range of, for example, 32 bins in order to map in that exemplary case the ADC input from [−1; +1] to 32 numbers when the ADC is a 5-bit ADC.

In FIG. 5a, the electrical signal has a DC component equal to zero and an AGC amplification value equal to unity such that the AGC DC-free output signal y verifies the following equation (3):

$$y=x \quad (3)$$

As can be seen, several outer bins are empty such that said AGC output signal y is not well mapped to the ADC input.

In FIG. 5b, the electrical signal has a DC component equal to zero and an AGC amplification value equal to 1.3 such that the AGC DC-free output signal y verifies the following equation (4):

$$y=1.3x \quad (4)$$

As can be seen, some positive bins close to +1 are empty while the signal experiences some serious clipping over −1 such that said AGC output signal y is not fully well mapped to the ADC input.

In FIG. 5c describing the second embodiment of the invention, the electrical signal has a DC component equal to 0.15 and an AGC amplification value equal to 1.3 such that the AGC output signal y verifies the following equation (5):

$$y=1.3x+0.15 \quad (5)$$

As can be seen, no bin is empty and a very weak clipping occurs over +/−1 such that said AGC output signal y can be considered fully well mapped to the ADC input.

In order to obtain the control function y defined by the following equation (6):

$$y=ax+b \quad (6)$$

where a represents the AGC amplification and b represents the DC component that can be implemented by adding a DC signal in front of the ADC, we set two parameters p1 and p2, where p1 defines a set of outer bins and p2 an occupancy rate of outer bins, for instance expressed as a percentage. Such a set can include unequal negative and positive outer bins since the symmetry of the histogram plot is not mandatory.

The AGC amplification (a) and the DC component (b) are adjusted iteratively until the parameter p2 is within some limits defined by an additional parameter p3. So, the system is stable and does not require any further adjustment when the percentage of signal in outer bins p1 satisfies the inequality (7):

$$p2-p3 \leq p1 \leq p2+p3 \qquad (7)$$

One iteration enables the adjustment of a, whereas the parameter b is then adjusted by controlling the symmetry in positive and negative bins.

The digital signal output from the respective ADC is supplied to the input of a respective transfer function compensation (TFC) device compensating for the limited bandwidth of the electrical and optical components of the multi-channel receiver 300-Rx.

Indeed, the limited bandwidth of the electrical and optical components and the connections may seriously limit the spectrum of the received signal and thereby result in a performance degradation. In order to partly compensate for that degradation, the signal at the multi-channel receiver 300-Rx (and also at the multi-channel transmitter 300-Tx as aforementioned) can be processed by transfer function reshaping blocks. The signal after a spectrum re-shaper (SRS) has stronger high frequency components within a certain frequency range. The SRS uses either time- or frequency-domain methods. The time-domain SRS (TD-SRS) has a bit weaker performance than the frequency-domain one (FD-SRS). However, that difference can be tolerated with respect to the very low complexity of the TD-SRS, which can be realized via a finite impulse response (FIR) filter with a few taps, e.g. 7 taps, while the FD-SRS requires a much higher complexity in particular when a high level of parallel data processing is required.

Whereas the transmitter TFC (Tx TFC) can use a few FIR taps with the only aim at increasing the high-frequency signal spectrum after the DAC, the Rx TFC uses another specific configuration. The compensation transfer function (H) of the Rx TFC is calculated according to the following steps:
1. defining the system transfer function (H1) in the frequency domain;
2. defining the target transfer function (H2) in the frequency domain;
3. calculating the compensation transfer function (H) according to H=H2/H1 in the frequency domain; and
4. when H is achieved in the time domain, finding the impulse response (h) of the compensation transfer function (H) and windowing the response to n FIR taps.

Thus, unlike some conventional SRS methods that estimate the system transfer function (H1) and use it to derive H, we use an estimated transfer function (TF) with the sole purpose to find any weak frequency portion. The most important information is a 3 db cut-off frequency while the TF shape is not so important. Next, we assume a transfer function (TF) defined by a 3 dB cut-off and an order. Such a TF can, for example, be a Bessel filter, in which H1 and H2 can have different orders and 3 dB cut-offs. A first estimate (H') of H is given by the following equation (8):

$$H'=(H2/H1)*k \qquad (8)$$

where k is any rational number by taking $k=k_1/k_2$, where $k_1$ and $k_2$ are integers.

Afterwards, a second estimate (H") of H can be calculated according to the following equation (9):

$$H''=a*(H'/H'(1))-a \qquad (9)$$

where a is any positive real number and H'(1) is a DC component.

The parameter a impacts on the shape of the compensation function so that the noise amplification is less critical. The last step allows the final compensation transfer function (H) to be derived from the following equation (10):

$$H=10(H''/20) \qquad (10)$$

Figure 6:
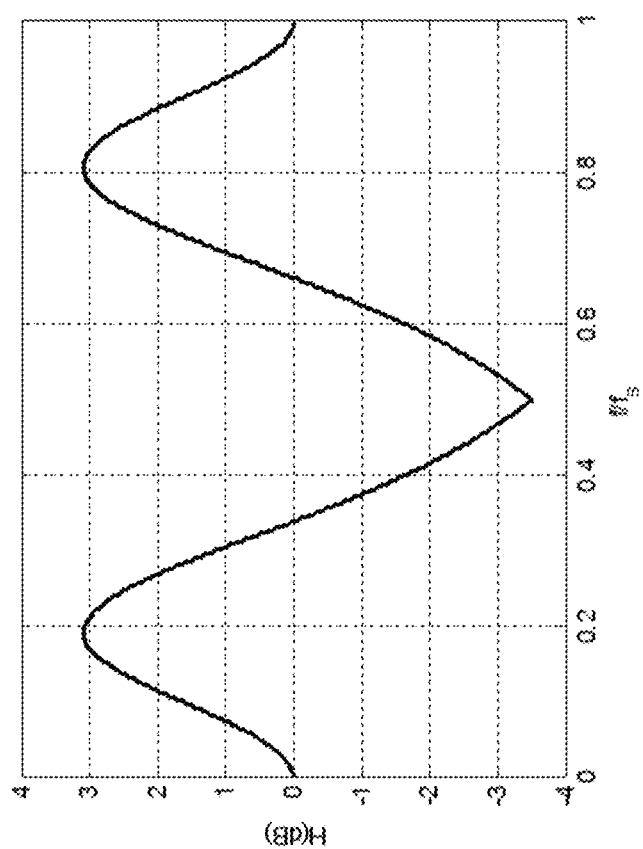
FIG. 6 shows an example of H(dB) in the frequency domain for Bessel filters according to a fourth embodiment of the present invention.

FIG. 6 shows an example of H(dB) in the frequency domain (f/fs) for Bessel filters used in H1 and H2 according to the fourth embodiment of the present invention.

The compensated signal is interpolated through a respective first interpolator (I1) and the interpolated signal is then provided both to a respective timing recovery (TR) circuit, which controls a sampling phase of the respective first interpolator (I1), and also to the input of a respective equalizer (Eq) that is adapted, through a sampling phase adjustment (SPA) device comprising a second interpolator (I2), to adjust the sampling phase.

Figure 7:
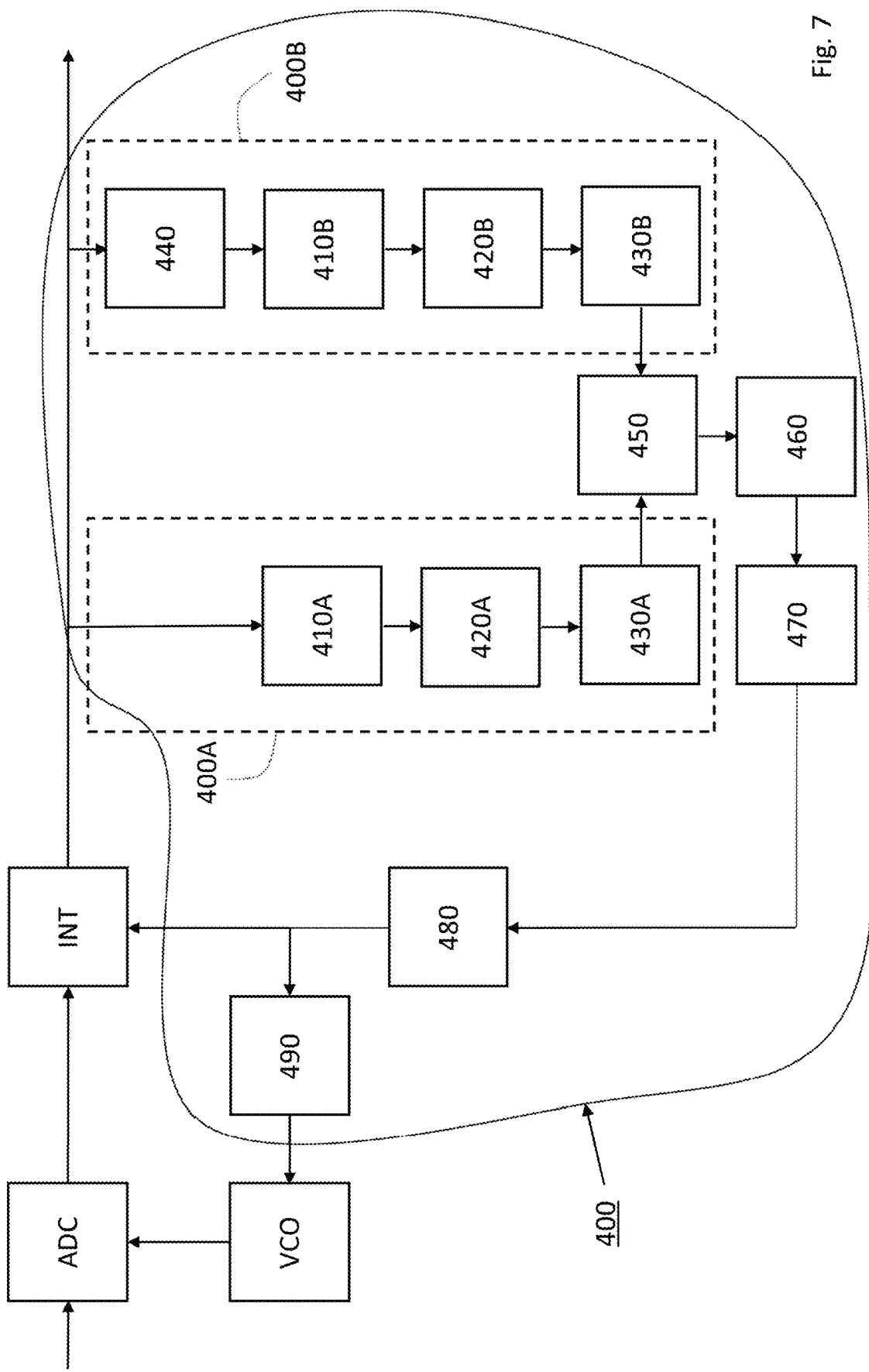
FIG. 7 shows a block diagram of a timing recovery circuit according to a fifth embodiment of the present invention.

FIG. 7 shows a block diagram of a timing recovery (TR) circuit 400 according to a fifth embodiment of the present invention. In a first phase, the TR circuit 400 comprises a first path 400A and a second path 400B parallel to the first path 400A, through which an input signal passes. The input signal of the TR circuit 400 can be an electrical digital signal output, for example, from an analog-to-digital converter (ADC) as depicted in FIG. 3, and passing through an interpolator (INT), such as I1 as depicted in FIG. 3, to be interpolated at a sampling phase provided by an output of the TR circuit 400. The first path 400A comprises a finite impulse response (FIR) filter 410A, a phase detector (PD) 420A and an infinite impulse response (IIR) filter 430A. On the other hand, the second path 400B comprises a quadrature circuit 440, a finite impulse response filter 410B, a phase detector 420B and an infinite impulse response filter 430B. In addition, the TR circuit 400 comprises an angle detector 450, an unwrapper 460, an inner filter 470, an integrator 480 and an outer filter 490.

The coefficients of the FIR filters 410A, 410B are selected depending on the channel conditions, such as fiber parameters, link length and optical signal-to-noise ratio (OSNR), in order to enable the frequency and phase acquisition within the predefined noise and inter-symbol interference (ISI) working range.

The FIR filter 410A of the first path 400A receives and filters the in-phase component of the input signal of the TR circuit 400, whereas the FIR filter 410B of the second path 400B receives and filters the quadrature-phase component of the input signal of the TR circuit 400. The quadrature-phase component can be obtained through the quadrature circuit 440, such as an interpolator, to shift the input signal of the TR circuit 400 by a quarter of its time period (T), i.e. by T/4. The resulting filtered input signals (x) are then respectively sent towards the PDs 420A, 420B to be converted to a respective phase signal (y) according to the following equation (11):

$$y(n)=\text{abs}(x(n))^k \text{sign}(x(n))\text{sign}(x(n+2))-\text{abs}(x(n+2))^k \text{sign}(x(n+2))\text{sign}(x(n)) \qquad (11)$$

where y denotes the output signal of the respective PDs 420A, 420B, x denotes the input signal of the respective PDs 420A, 420B, the input signal x being samples at a distance of a half period of the symbol period (i.e., of T/2), n denotes a sampling instant and k denotes a selectable parameter to minimize jitter. Each PD 420A, 420B uses one sample per symbol and the parameter k is selected by considering the channel conditions, such as fiber parameters, link length and OSNR, so that the values of k can, for example, be chosen in the range from 0.5 to 2.

In turn, the phase signals (y) are respectively sent towards the IIR filters 430A, 430B, such as first-order IIR filters, to be filtered and the respective resulting output signals are processed through the angle detector 450 to determine an angle of a complex signal between those two output signals, the angle ranging in value from 0 to $2\pi$ radians.

Based on the determined angle, the angle detector 450 outputs an angle signal that is sent towards the unwrapper 460 with the aim of avoiding any cycle slips. The phase value of the angle signal is thus unwrapped through a limited unwrapping transfer function that hinders some negative effects caused by any uncontrolled large frequency offsets.

The resulting unwrapped signal is filtered by the inner filter 470, such as a proportional-integral (PI) filter, and the resulting filtered signal is then accumulated in the integrator 480, such as a phase accumulator of a numerically controlled oscillator (NCO).

The output signal of the integrator 480 is sent towards both the interpolator (INT) in order to control its sampling phase, thereby forming an "inner" feedback loop, and also the outer filter 490, thereby forming an "outer" feedback loop.

It should be noted that the integrator 480 and the interpolator (INT) can be part of a NCO whose function consists of correcting for fast signal phase variations mainly caused by the imperfections of the transmitter clock source within the optical transceiver. Furthermore, while each PD 420A, 420B uses one sample per symbol, the interpolator (INT) may require more than one sample per symbol to provide acceptable interpolation performance. For example, the interpolator (INT) can use 1.25 or more samples per symbol.

The signal received at the outer filter 490 is then filtered to obtain a timing control signal, which can afterwards be sent towards an oscillator, such as a voltage-controlled oscillator (VCO) as depicted in FIG. 3, to control its phase and its frequency. In turn, the oscillator can generate a clock to be provided to the ADC.

As can be gathered from the above, the "inner" feedback loop enables to track the fast signal phase variations, while the "outer" feedback loop enables to acquire the frequency offset between the respective oscillators at the transmitter and receiver side. In addition, the communication with the oscillator is often performed by a synchronous serial data protocol, such as a serial peripheral interface (SPI), such that the "inner" feedback loop is configured to operate faster than the "outer" feedback loop.

Figure 8:
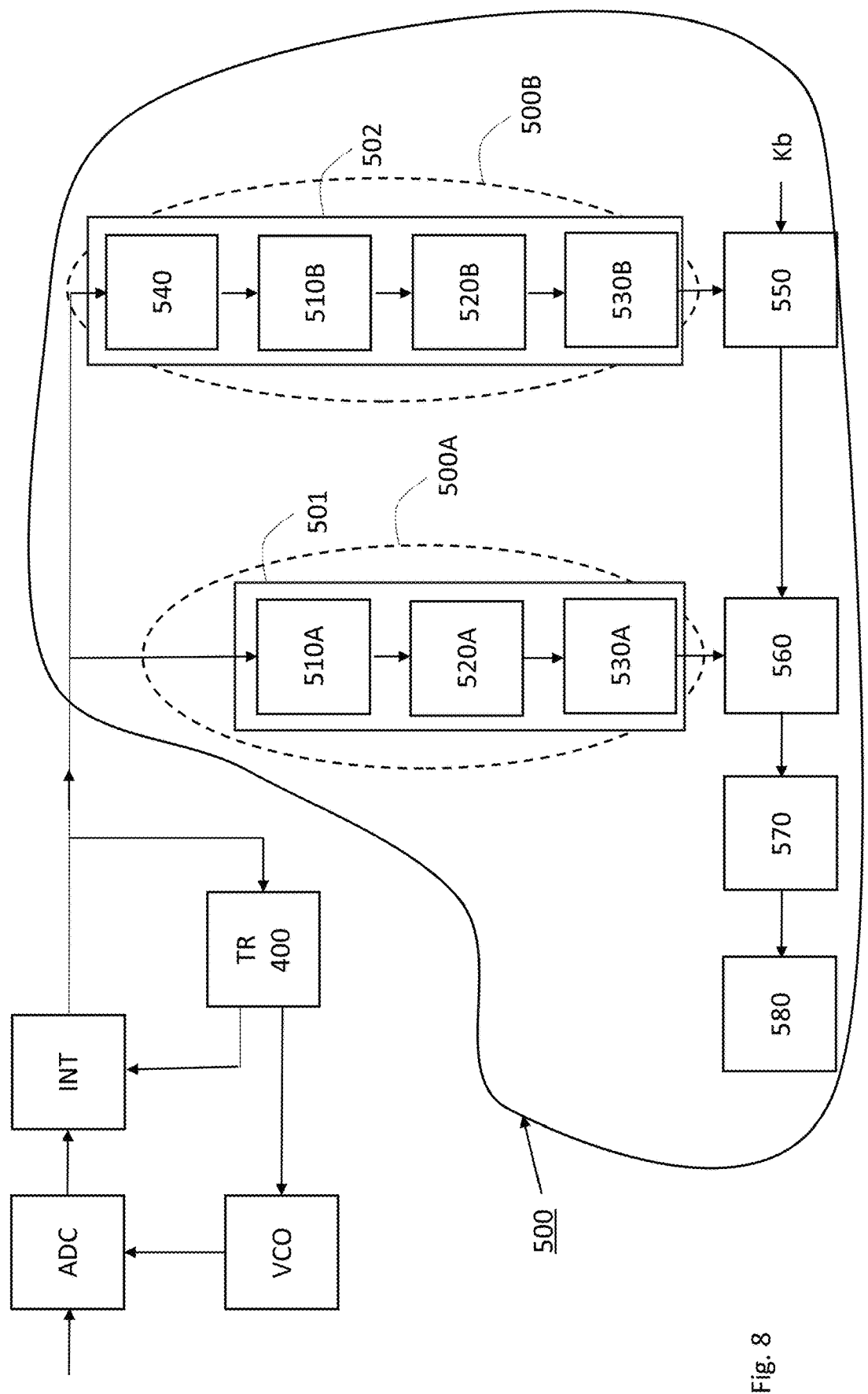
FIG. 8 shows a block diagram of a selection circuit according to a sixth embodiment of the present invention.

FIG. 8 shows a block diagram of a selection circuit 500 according to a fifth embodiment of the present invention. In a second phase, the selection circuit 500 is configured to operate a selection after obtaining the timing control signal as obtained through the timing recovery (TR) circuit 400 of FIG. 7. The selection circuit 500 comprises a first path 500A and a second path 500B parallel to the first path 500A, through which the input signal of the TR circuit 400 passes, i.e., the output signal provided by the interpolator (INT), after the operation of the TR circuit 400 of obtaining the timing control signal. The first path 500A comprises a jitter estimator 501 adapted to estimate a jitter and output an estimated jitter signal, which in turn comprises a finite impulse response (FIR) filter 510A, a phase detector (PD) 520A and a low-pass filter (LPF) 530A. On the other hand, the second path 500B comprises a timing error detector characteristic (TEDC) slope estimator 502 adapted to estimate a slope of the TEDC (i.e., a value of the coefficient Kpd) or a phase detector (PD) gain (i.e., a value of the coefficient Kpd) and output an estimated TEDC slope signal, which in turn comprises a time shifter 540, a finite impulse response filter 510B, a phase detector 520B and a low-pass filter 530B. In addition, the selection circuit 500 comprises a multiplier 550, a first calculator 560, a selector 570 and a second calculator 580.

The FIR filter 510A of the first path 500A receives and filters the in-phase component of the output signal of the interpolator (INT), whereas the FIR filter 510B of the second path 500B receives and filters a phase-shifted component of the output signal of the interpolator (INT). The phase-shifted component can be obtained through the time shifter 540, such as an interpolator, to shift the output signal of the interpolator (INT) by a value of its time period (T). That value can be determined to be close to a zero crossing (i.e., close to an equilibrium point) of the TEDC because the periodic TEDC, which is not always a sinusoidal function, is more linear in the vicinity of the equilibrium point. Thus, the output signal of the interpolator (INT) can be shifted by, for example, an eighth of its time period (T), namely by T/8, before entering the FIR filter 510B.

In the selection circuit 500, the FIR filters 510A and the FIR filters 510B are selectable FIR filters to be individually tested amongst a plurality of selectable FIR filters. The choice of those selectable FIR filters can be bound to the channel conditions. Thus, the FIR filters 510A in the first path 500A and the FIR filters 510B in the second path 500B can be identical to each other or different from each other.

The resulting filtered signals (x) in each first and second path 500A, 500B are then respectively sent towards the phase detectors (PDs) 520A, 520B to be converted to a respective phase signal (y) according the same equation (11) as aforementioned, where y denotes the output signal of the respective PDs 520A, 520B, x denotes the input signal of the respective PDs 520A, 520B, the input signal x being samples at a distance of a half period of the symbol period (i.e., of T/2), n denotes a sampling instant and k denotes a selectable parameter to minimize jitter. Each PD 520A, 520B uses one sample per symbol and the parameter k is selected by considering the channel conditions, such as fiber parameters, link length and OSNR, so that the values of k can, for example, be chosen in the range from 0.5 to 2.

The signals output from the PDs 520A, 520B are averaged by respective low-pass filters (LPFs) 530A, 530B to get more accurate estimations of both the jitter at the sampling phase in the first path 500A and the PD gain or TEDC slope in the second path 500B. With respect to the LPF 530A of the first path 500A, the LPF 530B of the second path 500B can have a lower cut-off frequency since the PD gain or TEDC slope estimation requires only a mean value estimation. Conversely and with respect to the LPF 530B of the second path 500B, the jitter estimation at the sampling phase in the first path 500A can have the LPF 530A with a higher cut-off to allow the detection of phase variations, which jitter including the jitter from the TR circuit 400 through the output signal of the interpolator (INT) and the jitter generated by the FIR filter 510A.

The signal output from the LPF 530B of the second path 500B is multiplied at the multiplier 550 by a predetermined coefficient Kb, which weights the PD gain or TEDC slope estimation in order to improve its accuracy and can exhibit a value, for example, less than 1.

The signal A output from the LPF 530A of the first path 500A corresponds to the estimated jitter signal output from the jitter estimator 501, whereas the signal B outputting from the multiplier 550 corresponds to the estimated TEDC slope signal output from the TEDC slope estimator 502. The signals A and B are sent towards the first calculator 560, which combines those two signals A, B to calculate a value resulting from the following mathematical formula (12):

$$\sqrt{\overline{(A-\overline{A})^2}}/\overline{B} \qquad (12)$$

The calculated value is provided to the selector 570 adapted to select as the selected FIR filters, the selectable FIR filters 510A, 510B amongst the plurality of selectable FIR filters that lead to the smallest calculated value, i.e., to the smallest jitter.

The result of the selection is then sent towards the second calculator 580 adapted to calculate the coefficients of two filters, such as proportional-integral (PI) filters, and denoted hereafter as adjusted filters.

It should be noted that the circuit (i.e., the TR circuit 400 and the selection circuit 500) as depicted in FIG. 8 can be implemented in a microcontroller and programmed to be used at low speed in order to track the slow variations of the channel conditions over time. Thereby, the selection and calculation process of the respective FIR filters and filter coefficients can be adaptive.

Figure 9:
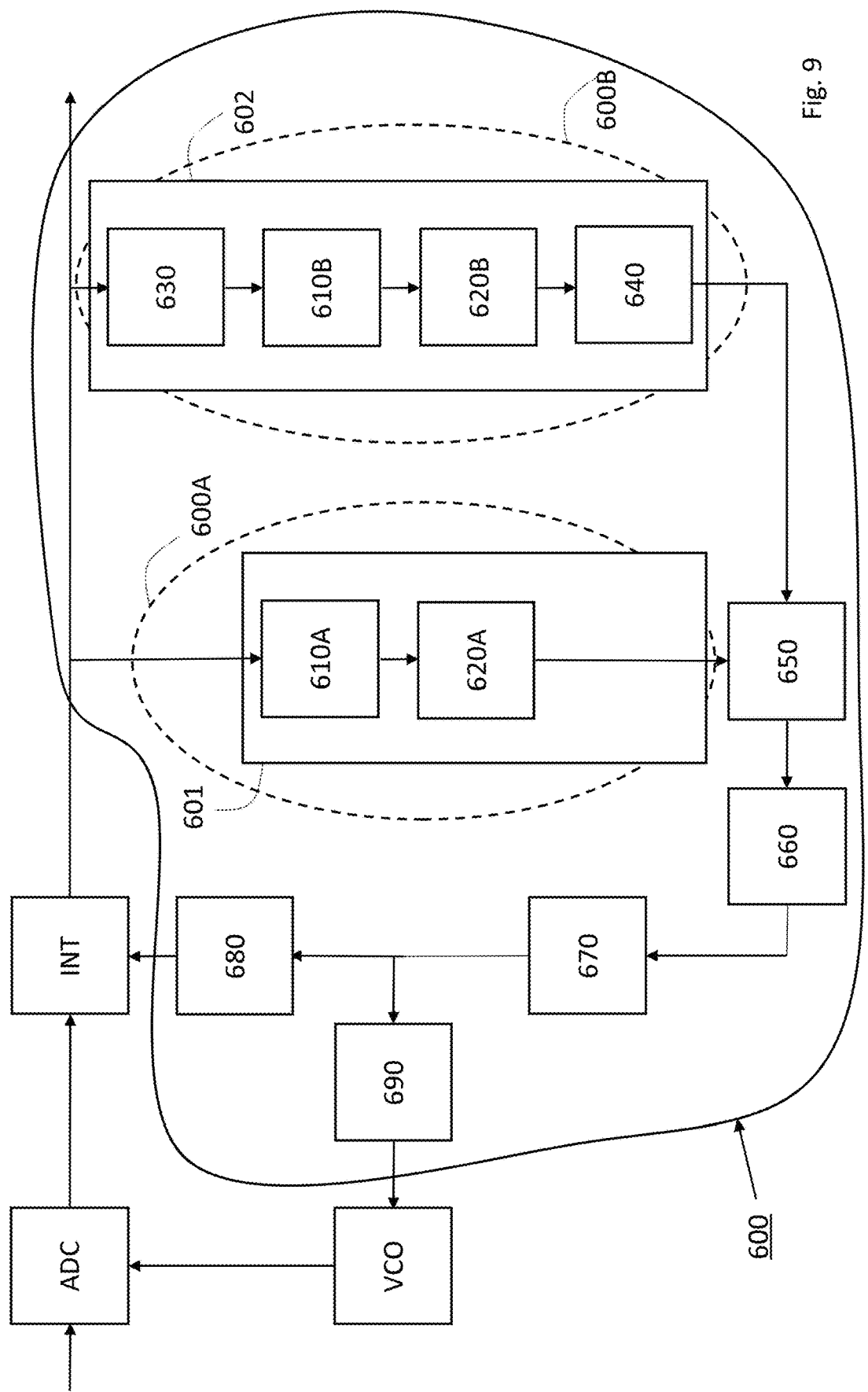
FIG. 9 shows a block diagram of a timing recovery circuit according to a seventh embodiment of the present invention.

FIG. 9 shows a block diagram of a timing recovery (TR) circuit 600 according to a sixth embodiment of the present invention. In a third phase, the TR circuit 600 is configured to operate a timing recovery after selecting the FIR filters 510A, 510B and calculating the coefficients of the PI filters as obtained through the selection circuit 500. The TR circuit 600 comprises a first path 600A and a second path 600B parallel to the first path 600A, through which an input signal passes. The input signal of the TR circuit 600 can be an electrical digital signal output, for example, from the analog-to-digital converter (ADC) as depicted in FIG. 3, and passing through the interpolator (INT), such as I1 as depicted in FIG. 3, to be interpolated at a sampling phase provided by an output of the TR circuit 600. The first path 600A comprises a jitter estimator 601 adapted to estimate a jitter and output an estimated jitter signal, which in turn comprises a finite impulse response (FIR) filter 610A and a phase detector (PD) 620A. On the other hand, the second path 600B comprises a timing error detector characteristic (TEDC) slope estimator 602 adapted to estimate a slope of the TEDC (i.e., a value of the coefficient Kpd) or a phase detector (PD) gain (i.e., a value of the coefficient Kpd) and output an estimated TEDC slope signal, which in turn comprises a time shifter 630, such as an interpolator, a finite impulse response filter 610B, a phase detector 620B and a low-pass filter 640. In addition, the TR circuit 600 comprises a processor 650, an inner filter 660, an integrator 670, a controller 680 and an outer filter 690.

The FIR filter 610A of the first path 600A receives and filters the in-phase component of the input signal of the TR circuit 600, i.e., the output signal of the interpolator (INT), whereas the FIR filter 610B of the second path 600B receives and filters a phase-shifted component of the input signal of the TR circuit 600. The phase-shifted component can be obtained through the time shifter 630, such as an interpolator, to shift the input signal of the TR circuit 600, i.e., the output signal of the interpolator (INT), by a value of its time period (T). That value can be determined to be close to a zero crossing (i.e., close to an equilibrium point) of the TEDC because the periodic TEDC, which is not always a sinusoidal function, is more linear in the vicinity of the equilibrium point. Thus, the output signal of the interpolator (INT) can be shifted by, for example, an eighth of its time period (T), namely by T/8, before entering the FIR filter 610B.

In this TR circuit 600, the FIR filters 610A and the FIR filters 610B correspond to the respective selected FIR filters obtained through the selection circuit 500 of FIG. 8. Thus, the FIR filters 610A in the first path 600A and the FIR filters 610B in the second path 600B can be identical to each other or different from each other, the FIR filters 610A, 610B being selected to generate the lowest jitter in given channel conditions.

The resulting filtered signals (x) in each first and second path 600A, 600B are then respectively sent towards the phase detectors (PDs) 620A, 620B to be converted to a respective phase signal (y) according the same equation (11) as aforementioned, where y denotes the output signal of the respective PDs 620A, 620B, x denotes the input signal of the respective PDs 620A, 620B, the input signal x being samples at a distance of a half period of the symbol period (i.e., of T/2), n denotes a sampling instant and k denotes a selectable parameter to minimize jitter. Each PD 620A, 620B uses one sample per symbol and the parameter k is selected by considering the channel conditions, such as fiber parameters, link length and OSNR, so that the values of k can, for example, be chosen in the range from 0.5 to 2.

The signal (y) outputting from the PD 620B is averaged by the low-pass filter (LPF) 640 to get more accurate estimations of the phase detector (PD) gain or timing error detector characteristic (TEDC) slope in the second path 600B. It should be noted that the LPF 640 can have a low cut-off frequency since the PD gain or TEDC slope estimation requires only a mean value estimation.

The signal A output from the PD 620A of the first path 600A corresponds to the estimated jitter signal output from the jitter estimator 601, whereas the signal Z output from the LPF 640 of the second path 600B corresponds to the estimated TEDC slope signal output from the TEDC slope estimator 602.

The signal Z output from the LPF 640 is received at the processor 650 to be processed with the signal A output from the PD 620A in order to normalize the signal A to have a unity PD gain or TEDC slope (i.e., Kpd=1). Thereby, an immunity to the variations of the channel conditions can be obtained. In case that the time shift has, for example, a value of T/8, the signal A will be normalized to A/8Z.

The normalized signal output from the processor 650 is sent towards the inner filter 660, such as a proportional-integral (PI) filter, which corresponds to the respective adjusted filter obtained through the selection circuit 500 of FIG. 8.

The resulting filtered signal is then accumulated in the integrator 670, such as a phase accumulator of a numerically controlled oscillator (NCO).

The signal output from the integrator 670 is sent towards both the controller 680 in order to control the sampling phase of the interpolator (INT), thereby forming an "inner" feedback loop, and also the outer filter 690, thereby forming an "outer" feedback loop.

The signal output from the integrator 670 and received at the outer filter 690 corresponds to the respective adjusted filter obtained through the selection circuit 500 of FIG. 8, and is then filtered to obtain a timing control signal. The timing control signal obtained through the TR circuit 600 of FIG. 9 is optimized with respect to the timing control signal obtained through the TR circuit 400 of FIG. 7 and can afterwards be sent towards an oscillator, such as a VCO, as depicted in FIG. 9, to control its phase and its frequency. In turn, the oscillator can generate an enhanced clock to be provided to the ADC. Thereby, an enhanced clock extraction from a noisy and dispersive optical signal can be performed in extremely band-limited systems, such as systems of bandwidth smaller than a quarter of baud rate.

It should be noted that the integrator 670, the controller 680 and the interpolator (INT) can be part of an NCO whose function consists of correcting for fast signal phase variations mainly caused by the imperfections of the transmitter clock source within the optical transceiver. Furthermore, while each PD 620A, 620B uses one sample per symbol, the interpolator (INT) requires more than one sample per symbol to provide acceptable interpolation performance. For example, the interpolator (INT) can use 1.25 or more samples per symbol.

As can be gathered from the above, the "inner" feedback loop enables to track the fast signal phase variations, while the "outer" feedback loop enables to acquire the frequency offset between the respective oscillators at the transmitter and receiver side. In addition, the communication with the oscillator is often performed by a synchronous serial data protocol, such as a serial peripheral interface (SPI), such that the "inner" feedback loop is configured to operate faster than the "outer" feedback loop.

In the fixed-run mode, each channel of the multi-channel receiver 300-Rx amongst the master channel (channel 1) and the slave channels (channels 2 to M1) controls the sampling phase of its respective first interpolator (I1) after sequentially applying the first, second and third phases. Only the TR circuit of the master channel is adapted to control the phase and the frequency of the single oscillator (VCO) through the timing control signals obtained in the first and third phases. Thereby, the plurality of M1 channels of the multi-channel receiver 300-Rx working in the fixed-run mode can be controlled by an identical clock signal (Rx-clk) generated by the oscillator of the master channel (channel 1). So, in the fixed-run mode, the TR circuit of each channel has a respective "inner" feedback loop, whereas only the TR circuit of the master channel has additionally an "outer" feedback loop.

In another embodiment, the multi-channel receiver 300-Rx can also be adapted to work in a free-run mode when the received multiplexed optical signals at the receiver come from a plurality of different multi-channel transmitters.

Figure 10:
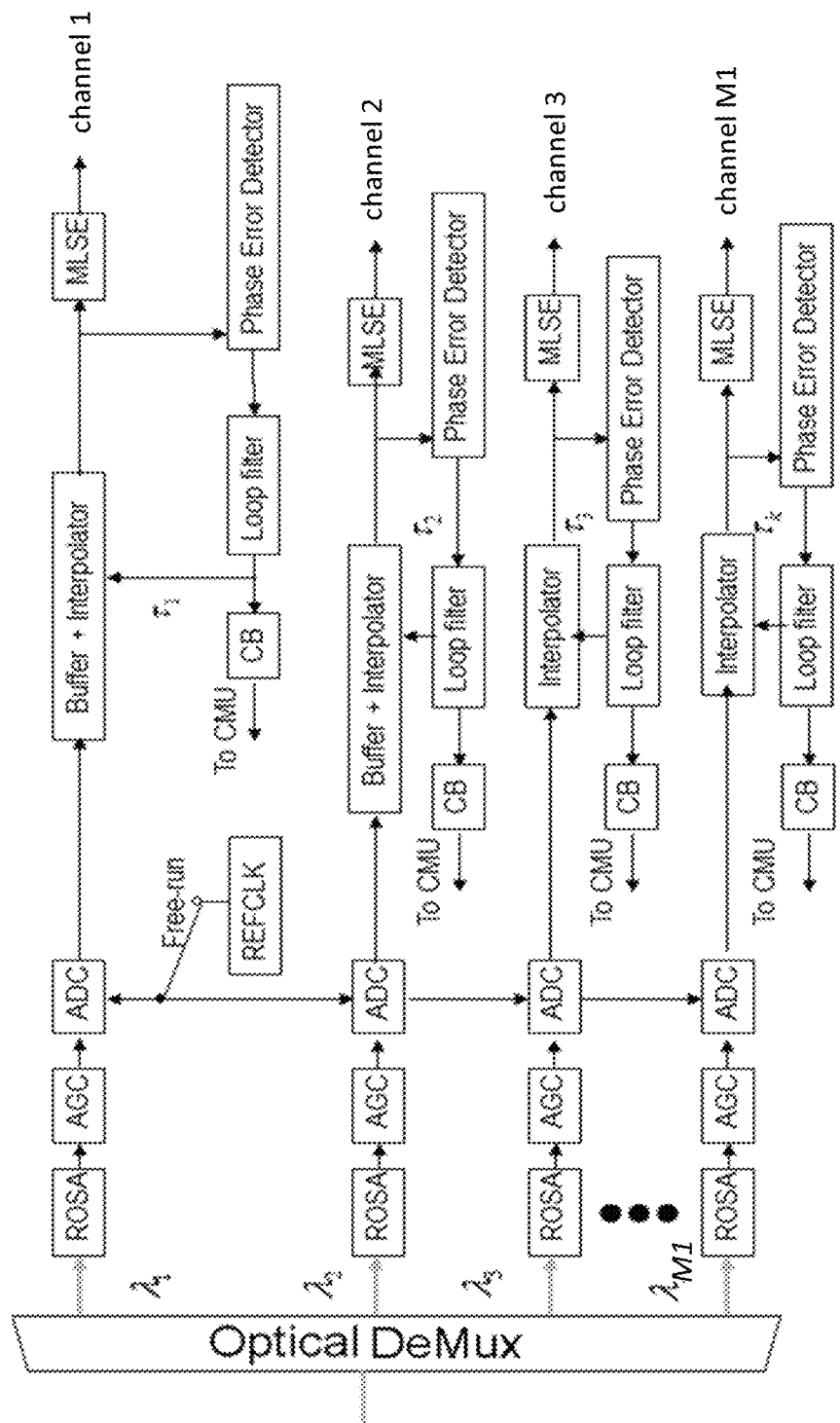
FIG. 10 shows an illustrative multi-channel multi-wavelength receiver in a free-run mode according to an eighth embodiment of the present invention.

FIG. 10 shows an illustrative multi-channel multi-wavelength receiver in a free-run mode according to an eighth embodiment of the present invention, wherein the notation X represents a wavelength.

As the channel clocks are independent, the TR circuit of each channel has only a respective "inner" feedback loop and no "outer" feedback loop. Each channel of the multi-channel receiver 300-Rx amongst the master channel (channel 1) and the slave channels (channels 2 to M1) controls the sampling phase of its respective first interpolator (Interpolator) after sequentially applying the second and third phases, the first phase being not used. The plurality of M1 channels is then controlled by an identical clock signal as a reference clock signal (Refclk), which is generated to have a higher frequency than the highest frequency of each received clock signal amongst the plurality of M1 channels. To do so, the highest frequency can be incremented by a small quantity df (e.g., 30 ppm of f). Thus, in the exemplary case that the received clock signals have frequencies ranging from f' to f" where f">f', then the frequency of the reference clock signal will be equal to f"+df=f"+30*f"/10$^{-6}$. All the ADCs of each channel will receive the same reference clock signal (Refclk). Furthermore, when the buffer of a respective interpolator is full, the control unit (CB) will inform the clock management unit (CMU) to generate a clock gap for the corresponding channel and all the CMOS blocks will stop working with the exception of the ADC and the buffer.

The equalizer (Eq), which receives at its input the interpolated signal, can comprise a maximum likelihood sequence estimation (MLSE) decoder, which can work with one or two samples per symbol and have a reconfigurable number of states.

The MLSE equalizer (Eq) can further work in a blind mode starting from the well-designed starting channel models (SCMs). Since the list of SCMs contains at least two starting channel models, the better one must be selected. To that extent, the SCM selection can be carried out through the SCM selection circuit of FIG. 11, which comprises the MLSE decoder, a channel model (CM) device, a channel model quality estimation (CMQE) device, a starting channel model list (SCML) device and a control unit (CU).

The SCMs are first stored in the SCML device whose list contains at least two SCMs. The first SCM is provided to the MLSE decoder. After several iterations, the new CM is derived in the CM device. In the last iterations, the MLSE decoder delivers a best path difference (BPD) vector to a channel model quality estimation (CMQE) device, which then calculates a new variable channel model quality (CMQ) value of the considered SCM, which value is stored in a control unit (CU). Next, the steps are iteratively repeated for each other SCM stored in the SCML device and the CU then selects the SCM having the smallest CMQ value and thereby corresponding to the best SCM amongst the SCMs stored in the SCML device. The MLSE decoder can afterwards work with the selected SCM.

The CMQ values are periodically checked and if a CMQ value reaches or exceeds a predefined threshold defining, for example, a channel loss, the whole steps of selecting the best SCM are then repeated.

In general, the MLSE decoder selects the best sequence among all possible transmitted sequences of N symbols, where N can be infinite. Despite the huge number of possible combinations, the complexity of such a selection method can however be drastically reduced by limiting the number of best candidates using the Viterbi algorithm (VA). Indeed, a VA-MLSE keeps the number of decoded sequence candidates equal to the number of MLSE states S.

Figure 11:
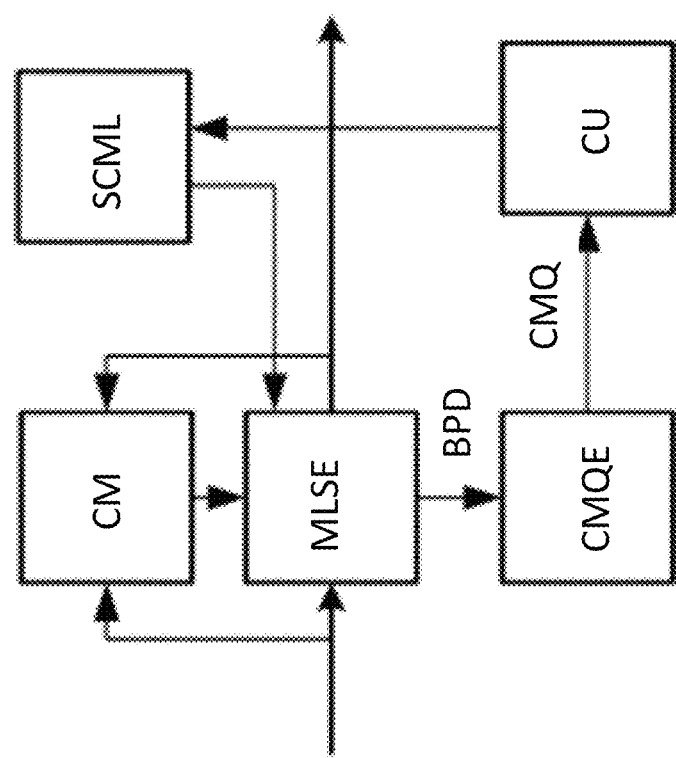
FIG. 11 shows a starting channel model selection circuit according to a ninth embodiment of the present invention.
Figure 12:
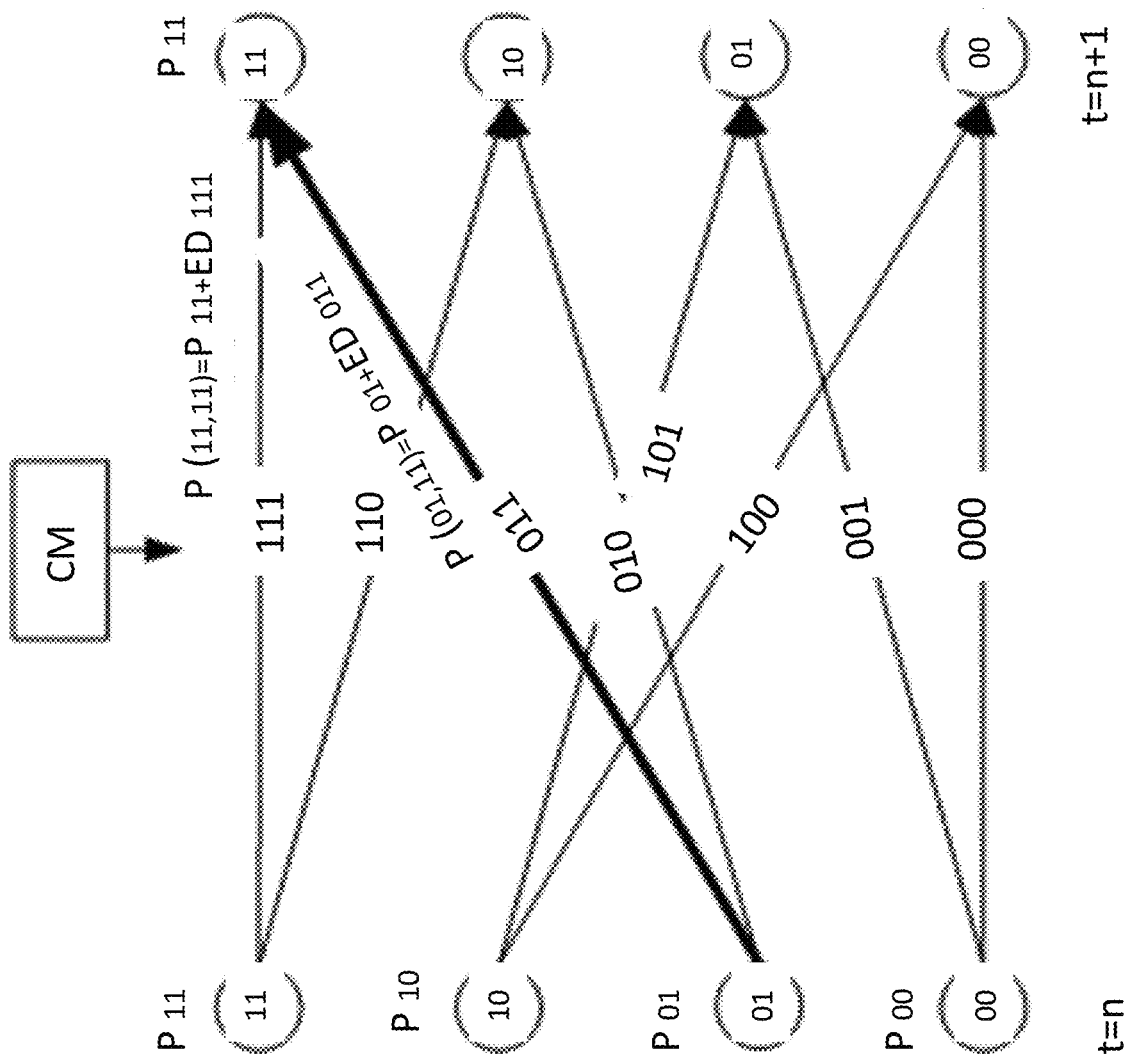
FIG. 12 shows a trellis for an exemplary binary 4-state MLSE decoder according to a tenth embodiment of the present invention.

In order to describe the selection method more easily, FIG. 12 depicts a trellis for an exemplary binary 4-state MLSE decoder. The N cells are concatenated and the final decision can be made either after the whole sequence of N symbols or after a sequence of L symbols, where L is a decoding depth. In a binary case, two branches enter and leave each of the four states, the states being denoted by 00, 01, 10 and 11 in FIG. 12. The parameter p assigned to each state represents the probability of a sequence being in that state at this given time. Each new state has two inputs and only one of them is selected based on two new calculated probabilities. In a MLSE decoder using metrics based on the Euclidian distance (ED), the branch metrics (ED) verify the following equation (13):

$$ED=(x-\mu_0)^2 \tag{13}$$

where x is a quantized sample and μ0 is the expected value obtained from the CM device of FIG. 11.

In the case of two samples per symbol, the branch metrics (ED) verify the following equation (14):

$$ED=(x_1-\mu_{01})^2+(x_2-\mu_{02})^2 \tag{14}$$

where x and are labeled with the indices 1 and 2 corresponding to both samples.

Two paths (P) are compared and the better one is selected. As depicted in the exemplary FIG. 12 starting from the time instant t=n, two paths P(11, 11) and P(01, 11) are identified as candidates for the state 11 at the time instant t=n+1. By labeling the time transitions with a three-bit notation, we obtain the following equations (15, 16):

$$P(11,11)=p11(n)+ED111(n+1) \quad (15)$$

and $$P(01,11)=p01(n)+ED011(n+1) \quad (16)$$

Since p11(n)+ED111 (n+1)>p01(n)+ED011(n+1), the lower path, namely P(01, 11), is selected such that p11(n+1)=p01(n)+ED011(n+1).

Identically to P, one decoding vector (DV) is assigned to each state and changes locations. DV increases the length by 1 after each cell such that the length of DV(n+1) minus the length of DV(n) equals to 1. For the considered state 11, we obtain DV11(n+1)=DV01(n) and DV11(n+1, n+1)=d, where d represents the decoded bits (0, 1) assigned to the branch leading from state 01 to 11, namely the branch 011.

In fast communication systems, the MLSE decoder decodes blocks of data. In a simple configuration, a MLSE decoder can consist of K bits to be decoded from a current block, L bits from the previous block and L bits from the next block, as shown in FIG. 13a.

FIG. 13b shows a decoding block of the MLSE decoder, denoted as a MLSE decoding block, where N is the size (in bits) of the MLSE decoding block, K is the number of decoded bits per block, M is a channel memory length, L is the overlapping factor or decoding depth verifying the equation L=(N−K)/2 and being approximately equal to 4M in many applications, and S is the number of states verifying, in the case of a binary MLSE decoder, the relationship $S=2^M$.

If one bit can be processed per clock, the MLSE decoding block must process N blocks of data at the same time. A block k+1 inherits path values and decoding vectors (DV) from block k and processes the next symbol. Depending on N and L values, the DV vector can have a length L or K+L. In longer vector configurations, the decoding is performed after processing all bits, while in shorter vector configurations, the decoding is performed by decoding one bit after each MLSE cell.

Figure 14:
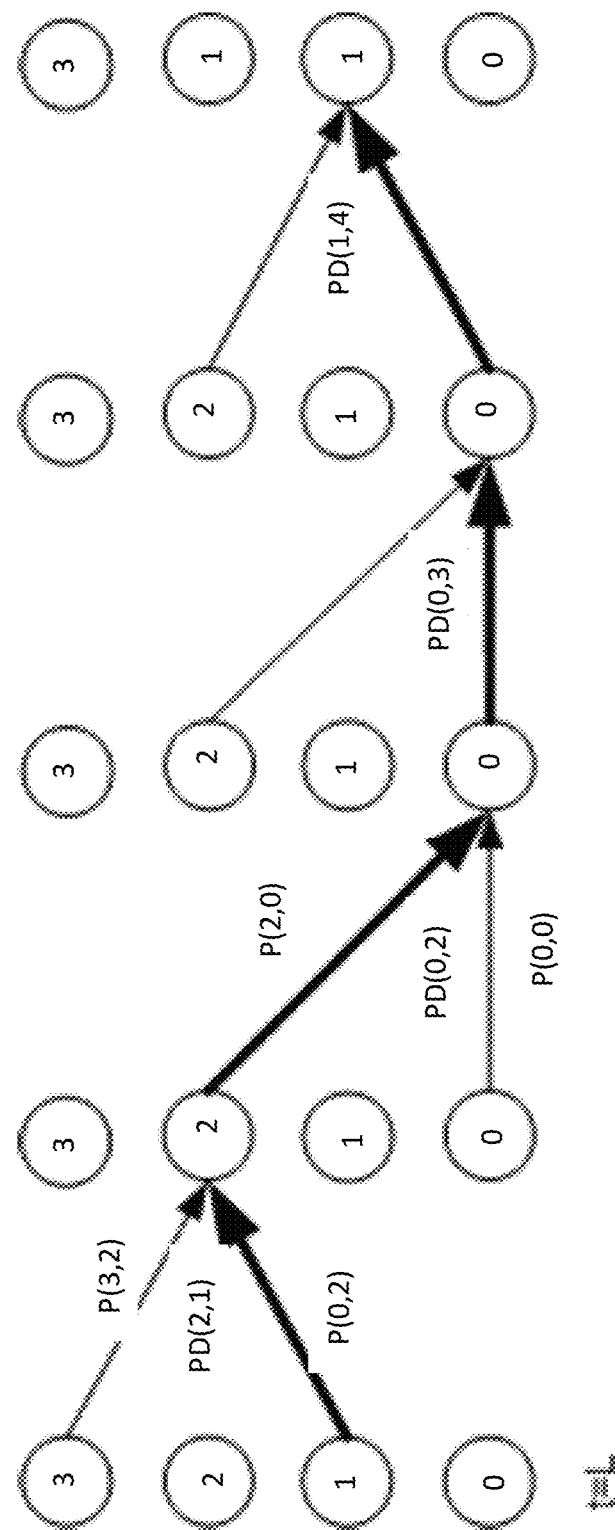
FIG. 14 shows a MLSE trellis according to a twelfth embodiment of the present invention.

In order to obtain the BPD vector, we introduce S(N-L) matrix PD to store the absolute difference between two competitors entering the same state. For example, as depicted in the MLSE trellis of FIG. 14 where the PD matrix filling starts after the L-th symbol, PD(2,1)=abs(P(3,2)−P(1,2)), PD(0,2)=abs(P(2,0)−P(0,0)), PD(0,3)=abs(P(2,0)−P(0,0)) and PD(1,4)=abs(P(2,1)−P(0,1)).

Identically to the decoding vector filling, the BPD vector contains the difference of two paths. After the whole sequence, the best state Sb is selected and the BPD vector is then equal to PD(Sb,).

Then, the value of CMQ can be calculated as follows (17):

$$CMQ = \frac{1}{N_1}\sum_{i=1}^{N_1} Q(i) \quad (17)$$

$$Q(i) = \begin{cases} 1 & , BPD(i) < BPDL \\ 0 & , BPD(i) \geq BPDL \end{cases}$$

Since the PD matrix requires high complexity, we developed a simplified configuration rendering the algorithm feasible. Thus, a vector (PDS) of S entries is introduced to replace the matrix PD. After L symbols, the PDS vector is generated based on a new definition of Q, as given by (18):

$$Q(i) = \begin{cases} 1 & , PD(i) < BPDL \\ 0 & , PD(i) \geq BPDL \end{cases} \quad (18)$$

At a time instant t=L+1, we set PDS(i,1)=Q(i). After processing the next symbol, new PDS values are derived by using PDS(i,2)=PDS(j,1)+Q(i), where j corresponds to the index of the best arriving path, knowing that there are two paths or directions in a binary MLSE. At the end of data block, the best state (Sb) is selected and the value of CMQ can be calculated as follows (19):

$$CMQ = \frac{1}{N_1}PDS(S_b) \quad (19)$$

Instead of storing S*N1 values, that simple configuration requires only one vector of size S, one comparator and one binary adder per state.

A BPD limit (BPDL) depends on the number of samples per symbol used in the MLSE decoder. If we set BPDL to Z in the case of one sample per symbol, then BPDL is equal to n*Z for n samples per symbol, wherein Z depends on the ADC resolution. In order to get more accurate results since the estimation accuracy of the CMQ parameter is similar to the BER estimation using the Monte Carlo method, the value of CMQ shall be calculated over several blocks, e.g., P blocks, as follows (20):

$$CMQ = \frac{1}{PN_1}\sum_{j=1}^{P}\sum_{i=1}^{N_1} Q(i, j) \quad (20)$$

Figure 15:
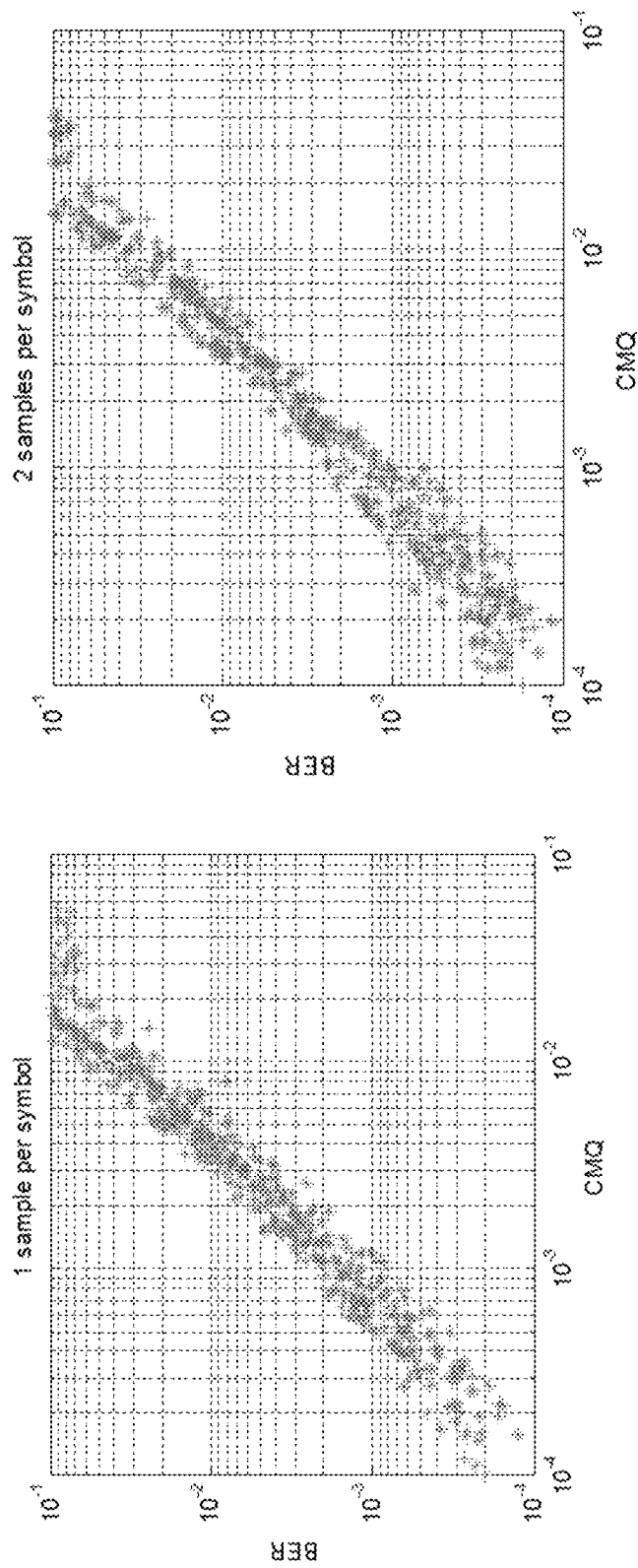
FIG. 15 shows a simulation result plot of the BER value as a function of the CMQ value on a logarithmic scale, in the case of one sample per symbol and two samples per symbol according to a thirteenth embodiment of the present invention.

In order to validate the estimation method, the data are processed off-line using an intensity-modulation and direct-detection receiver. Simulation data of 28 Gb/s were transmitted over different links with an input optical power resulting in BERs from $10^{-4}$ to 0.3. A MLSE decoder using one and two samples per symbol has been respectively tested and the number of MLSE states was 16 and 64. All estimation data are plotted in FIG. 15. The estimation results show that the logarithm values of CMQ and BER are linearly proportional to each other. The diagram of FIG. 15 shows that the CMQ estimations are scattered similarly to the Monte Carlo BER estimations. In the case of a pre-FEC BER of $2\times10^{-3}$, the reacquisition trigger can be set to $3\times10^{-3}$ to restart the system when the BER is already at the FEC limit.

Figure 16:
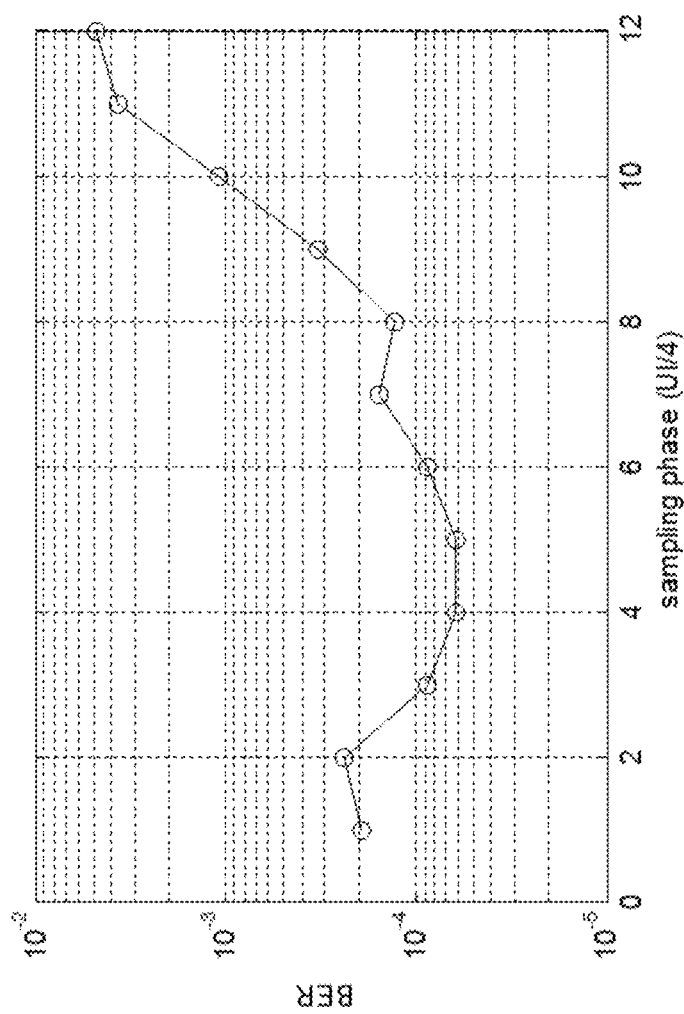
FIG. 16 shows a simulation result plot of the BER value as a function of the sampling phase according to a fourteenth embodiment of the present invention.

The TR circuit samples the received signal at a specific sampling phase within one unit (symbol) interval (UI). That sampling phase is usually suboptimal and may even provide an extremely bad performance. We have simulated a distorted channel (CD) and used the MLSE decoder to compensate for the ISI. The sampling phase was varied over 4 UI in step of UI/4, such that 12 estimations have been obtained. The simulation results presented in FIG. 16 indicate that the sampling phases at the positions 4 and 5 provide the best BER performance of $6\times10^{-5}$. However, in a blind mode, the sampling phase and the starting channel model (SCM) may cause locking at the position 2, which has a quite large BER of $2.5 \times 10^{-4}$. Under those conditions, the problem is to know how to detect the best sampling phase (BSP).

A solution would be to scan sampling phases, obtain the information from FEC about the input errors, and select the sampling phase providing the minimum number of errors. However, that solution leads to numerous issues: the FEC must exist, the scanning over a large sampling phase region may cause a traffic interruption and a bad BER performance, and the channel may change such that the searching algorithm must periodically check the sampling phase.

Thus, we propose as a solution a more efficient search algorithm consisting of two phases: a first phase (phase 1) allowing to obtain a rough sampling phase adjustment carried out during the acquisition, and a second phase (phase 2) allowing to obtain a fine sampling phase adjustment after the acquisition.

Figure 17:
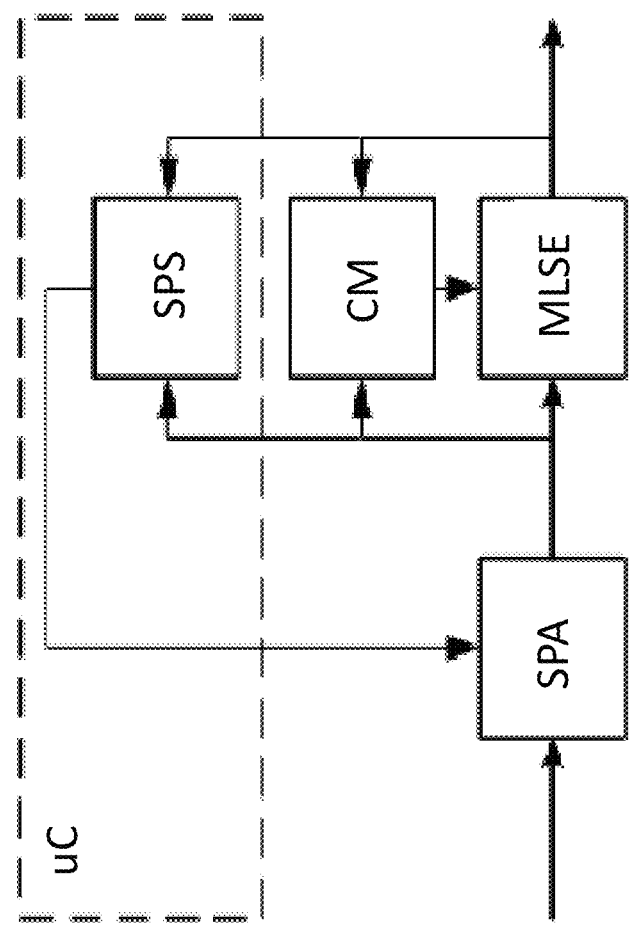
FIG. 17 shows a MLSE equalizer for equalizing input samples at an adjusted sampling phase according to a two-phase adjustment according to a fifteenth embodiment of the present invention.

FIG. 17 shows a MLSE equalizer (Eq) for equalizing input samples at an adjusted sampling phase according to a two-phase adjustment according to one embodiment. The MLSE equalizer (Eq) works rather in the blind mode, because the training mode requires complex synchronization algorithms, and starts from the well-designed starting channel models (SCMs). Since the list of SCMs contains at least two starting channel models, the better one must be selected and the selection is carried out through the SCM selection circuit of FIG. 11.

In phase 1, the sampling phase selection (SPS) method is applied to the MLSE equalizer (Eq) working with an arbitrary number of samples per symbol. To minimize the complexity, a maximum of two samples per symbol is used in practice. However, one sample per symbol usually provides a suboptimum performance and is more sensitive to sampling phase variations and jitter. Although the algorithm uses quantized symbols, it is not limited to quantized systems.

After a few channel updates using the channel model (CM) device and the MLSE decoder, the MLSE output BER remains suboptimum. As depicted in FIG. 17, the SPS device uses data before and after the MLSE decoder. It should be noted that the SPS device can be partly or completely implemented in a microcontroller (tiC) to save the complexity as the sampling phase does not experience fast variations. The SPS device calculates a best sampling phase estimation (BSPE) parameter at carefully selected sampling phases and the sampling phase with the highest BSPE value is selected. The information about the optimum sampling phase is then sent from the SPS device towards a sampling phase adjustment (SPA) device, which adjusts the sampling phase in front of the MLSE decoder and hence the MLSE equalizer (Eq). The SPA device can comprise an interpolator, for example a cubic spline interpolator.

The BSPE uses a channel model that is defined via histograms. A binary L-state MLSE equalizer uses 2L different branch metrics. It holds L=2M, where M is the channel memory length. Each branch metric is defined by an N-bin histogram (pdf), where N is the resolution of the signal entering the MLSE equalizer. The histograms are normalized so that the sum of all bins is equal to 1. After the normalization, each histogram is defined by a mean value $\mu_i$ and a standard deviation $\sigma_i$, where $i=1, 2, \ldots, 2L$.

The variance of the mean values is defined as follows (21):

$$\sigma_\mu^2 = \frac{1}{2L} \sum_{i=1}^{2L} (\mu_i - \overline{\mu})^2 \quad (21)$$

It should be noted that the mean value of mean values being not necessarily equal to 0 after quantization, it is still presented in the equation (21).

The following metric sets, in which M+1 bits are attributed to each branch and the MLSE equalizer can use either one or two samples (denoted as samples A and B), can be defined as follows:

H1 represents all branches decoding 1 (e.g., xx1xx in a 16-state MLSE equalizer), x=0, 1;

H0 represents all branches decoding 0 (e.g., xx0xx in a 16-state MLSE equalizer);

H11 represents all branches with three ones (111) in the middle (e.g., x111x in a 16-state MLSE equalizer);

H00 represents all branches with three zeroes (000) in the middle (e.g., x000x in a 16-state MLSE equalizer);

H01 represents all branches with three zeroes (000) or three ones (111) in the middle, such that H01=H00+ H11.

New variables are introduced as follows (22):

$$K_1^W = \overline{\mu(H_{11}^W)} - \overline{\mu(H_{00}^W)}$$

$$K_2^W = \overline{\mu(H_1^W)} - \overline{\mu(H_0^W)}$$

$$W = A, B \quad (22)$$

The BSPE value for one sample per symbol is defined as follows (23):

$$BPSE^1 = BPSE^A = \frac{\sigma_\mu^2(H_{01}^A)}{\sigma^2(H_1^A)} (aK_1^A + bK_2^A), 0 \le a, b \le 1 \quad (23)$$

The BSPE value for two samples per symbol is defined as follows (24):

$$BPSE^2 = BPSE^{A,B} = \frac{\sigma_{\mu,A}^2 + \sigma_{\mu,B}^2}{\sigma_A^2 + \sigma_B^2} (a(K_1^A + K_1^B) + b(K_2^A + K_2^B)), \quad (24)$$

$$0 \le a, b \le 1$$

A counter table (CT) is used for the BSPE required channel model estimation. It is a two-dimensional table with 2M+1 rows and 2N columns. At the beginning, the table entries are set to 0. Two CTs may be provided for each sample (A, B), namely one CT for the sample A (CTA) and one CT for the sample B (CTB). The branch address uses 2M+1 bits to address the row of the CT and the quantized sample value is located in the column. In addition, the located counter content is increased by 1.

The sum of all table (any table) entries is equal to L=K−2M. The mean value of histogram (row) is defined as follows (25):

$$\mu_i(W) = \frac{1}{s_i} \sum_{j=0}^{2^N - 1} j c_{i,j}^W, \quad W = A, B \quad (25)$$

where the sum of the row i is denoted as si and each row represents the quantized histogram of certain bit pattern. Furthermore, the sum of two rows (e.g., si for the row i and $s_j$ for the row j) does not need to be the same.

The variance histogram (row) is then calculated as follows (26):

$$\sigma_i^2(W) = \frac{1}{s_i} \sum_{j=0}^{2^N-1} c_{i,j}^W (j - \mu_i(W))^2, W = A, B \quad (26)$$

The signal first arrives from the timing recovery (TR) circuit with the sampling point 0 (timing recovery sampling phase). The MLSE equalizer (Eq) uses the starting channel model (SCM) from which the starting channel model (SCM) converges to the real channel conditions, and the acquisition will be assumed successful.

The BSPE algorithm uses a coarse and fine sampling phase scanning. In the first phase corresponding to the coarse sampling phase scanning, the BSPE value is calculated at different positions (e.g., 0, ±UI/2, ..., ±nUI/2) and the sampling phase kUI with the largest BSPE value is selected. During that coarse sampling phase scanning, the MLSE equalizer uses the channel model at the sampling phase 0, which is not updated, and the counter tables (CTs) are used for the BSPE required channel model estimation. The coarse sampling phase scanning is achieved through a simple sample shift.

Figure 18:
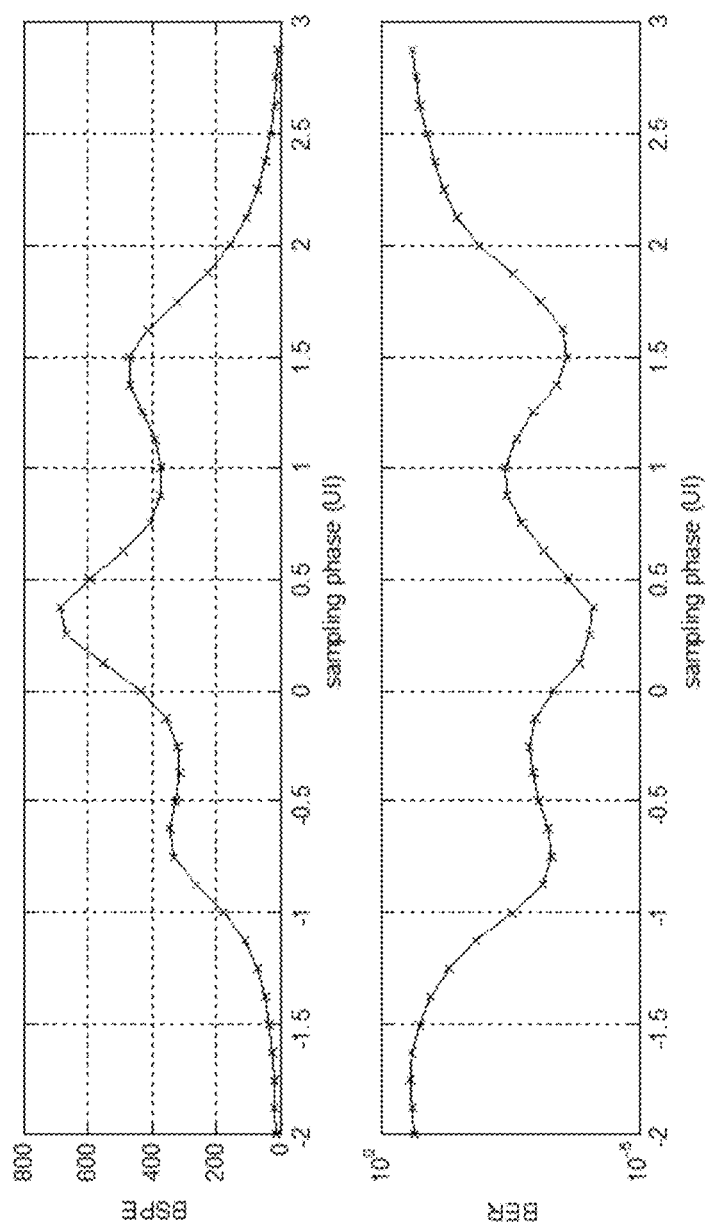
FIG. 18 shows a simulation result plot of the BSPE value and the BER value as a function of the sampling phase for one sample per MLSE symbol according to a sixteenth embodiment of the present invention.

Off-line data of an experimental 28 Gb/s-80 km transmission are processed. Electro-absorption modulator and direct detection through a PIN diode are used. The BSPE estimation and the BER over 5 unit intervals (UI) for one sample per MLSE symbol are presented in FIG. 18, the samples being quantized by a 5-bit ADC. The maximum BSPE value, which corresponds here to a sampling phase of about 0.4 UI, indicates the best BER. During the coarse sampling phase scanning, the sampling phase 0.5 UI is selected.

Although phase 1 provides very good results, in some specific channels a rough BSPE value may generate large errors (e.g., a BER several times higher than the BER at the optimum sampling phase). Therefore, it may be preferable to switch from the phase 1 to the phase 2 in order to obtain an optimal or quasi-optimal sampling phase.

The phase 2 is based on the most critical error events. In order to distinguish between the BSPE of the phase 1 and the BSPE of the phase 2, the BSPE of the phase 2 is denoted hereafter as SBSPE standing for super BSPE.

The MLSE equalizer can generate errors, which may be of different lengths such that the errors are grouped in bursts. Depending on the channel conditions and the MLSE memory length, the error bursts can have different probabilities and the error bursts with a maximum length of 3 are in the following considered the most critical. The bit patterns have also different error probabilities and the most critical error patterns for an M=4 and 6 binary MLSE equalizer (16- and 64-state MLSE equalizer) are considered in the following.

An error event is defined by 2M+E bits, where M is the memory length and E is the length of the error burst. Thus, for M=4 and E=3, the error event consists of 11 bits: $b_1 b_2 b_3 b_4 \underline{b_5} \underline{b_6} \underline{b_7} b_8 b_9 b_{10} b_{11}$, where b denotes an erroneous bit (i.e., an error). In that case, the MLSE equalizer uses the branches ($\underline{B}_i$):

B=$b_1 b_2 b_3 b_4 \underline{b_5}$, $b_2 b_3 b_4 \underline{b_5} \underline{b_6}$, ..., $\underline{b_7} b_8 b_9 b_{10} b_{11}$=($\underline{B}_1 \underline{B}_2 \underline{B}_3 \underline{B}_4 \underline{B}_5 \underline{B}_6 \underline{B}_7$), instead of using the branches ($B_i$):
B=$b_1 b_2 b_3 b_4 b_5$, $b_2 b_3 b_4 b_5 b_6$, ..., $b_7 b_8 b_9 b_{10} b_{11}$=($B_1 B_2 B_3 B_4 B_5 B_6 B_7$), where each branch ($\underline{B}_i$, $B_i$) is denoted by a number from 0 to $2^{M+1}-1$, namely from 0 to 31 in a 16-state MLSE equalizer.

Let us assume an error event of length 2: 0101 $\underline{001011}$=0101111011. If the least significant bit (LSB) is the first one in the binary representation (e.g., 10100=5), then we have:

B=(10 5 18 9 20 26) and $\underline{B}$=(26 29 30 15 23 27).

By processing off-line data, our simulation results for a 16- and 64-state MLSE equalizer reveal that the following error events are the most critical.

For a 16-state MLSE equalizer:
Single error event 0 0 0 1 0 1 0 0 0
B=(8 20 10 5 2) and B=(24 28 14 7 3)
Double error event 1 0 0 1 0 1 1 0 0 0
B=(8 20 26 13 6 3) and B=(24 12 22 11 5 2)
Triple error event 0 1 0 1 1 0 1 1 0 0 0
B=(24 12 22 27 13 6 3) and B=(8 20 10 21 10 5 2)
For a 64-state MLSE equalizer:
Single error event 1 0 0 0 0 1 0 1 0 0 0 0 0
B=(33 80 40 20 10 5 2) and B=(97 112 56 28 14 7 3)
Double error event 0 1 1 1 1 1 0 1 1 1 1 0 0 0
B=(62 95 111 119 123 61 30 15) and B=(126 63 95 111 119 59 29 14)
Triple error event 0 1 1 1 1 1 1 0 1 1 0 0 1 1 1
B=(126 63 95 111 55 27 77 102 115) and B=(62 95 47 87 43 21 74 101 114)

First, the probabilities of the error events are estimated and only indicate what the sampling phase is better to use.

We define 3 different Q factors ($Q_1$, $Q_2$, $Q_3$) for each competitor pair, B and B being vectors containing the competitors:

$$Q_1 = \frac{abs(\mu(B) - \mu(\underline{B}))}{\sigma(B) + \sigma(\underline{B})}, Q_2 = \frac{abs(\mu(B) - \mu(\underline{B}))}{2\sigma(B)}, Q_3 = \frac{abs(\mu(B) - \mu(\underline{B}))}{2\sigma(\underline{B})}$$

We define two different error event estimations ($E_1$, $E_2$) when applied to one sample per symbol:

$E_1$=sum(log·erfc($Q_1/\sqrt{2}$)), $E_2$=sum(log·erfc($Q_n/\sqrt{2}$)), $Q_{min}$=min($Q_2, Q_3$)

In the case of more samples per symbol, Q values are defined for each sample and the summation is done over all samples.

Finally, the SBSPE for one sample per symbol is defined by (27):

$$SBSPE_i = |E_i(1)||E_i(2)||E_i(3)|, i=1,2 \quad (27)$$

where $E_i(1)$ represents the error event estimation related to a single error event, $E_i(2)$ to a double error event, and $E_i(3)$ to a triple error event, $E_i(2)$ showing better results than $E_i(1)$.

In the case of two samples (a and b) per symbol, Q1 found in $E_1$ is defined for every sample while in $E_i(2)$ we use $Q_{min}$ as follows (28):

$$Q_{min} = \min(Q_2^a, Q_3^a, Q_2^b, Q_3^b) \quad (28)$$

In general, although some error events can be omitted or added, the SBSPE can be defined by (29):

$$SBSPE_i = \prod_{j=1}^{n} |E_i(p_j)| \quad (29)$$

where $p_j$ can be any non-zero positive integer. In the previous case, we had used p1=1, p2=2 and p3=3.

Afterwards, the errors in the decoded data are transmitted from the equalizer (Eq) towards the forward error correction (FEC) device to be eliminated. The resulting error-free data are then de-multiplexed through a de-multiplexer (DMUX) into K channels (numbered from 1 to K), wherein K may be different from N.

In summary, embodiments of the present invention relate to a multi-channel intensity-modulation direct-detection optical transceiver comprising at least one transmitter and a receiver, and a method for equalizing input samples at an adjusted sampling phase using a quality parameter linearly proportional to a BER. The data transmission and reception use a single master channel and slave channels, which have a baud rate equal to or lower than the baud rate of the master channel. A reliable and identical clocking of all the channels is obtained through either the receiver clock of the master channel when they are received from a single transmitter or a reference clock whose frequency is higher than the highest clock frequency amongst all the channels when they are received from a combination of transmitters. An enhanced timing recovery circuit is also provided to select optimized finite impulse response filters, calculate filter coefficients and generate the receiver clock of the master channel.

While embodiments of the invention have been illustrated and described in detail in the drawings and the foregoing description, such illustration and description are to be considered illustrative or exemplary and not restrictive. The invention is not limited to the disclosed embodiments. From reading the present disclosure, other modifications will be apparent to a person skilled in the art. Such modifications may involve other features which are already known in the art and which may be used instead of or in addition to features already described herein. In particular, the transmission system is not restricted to an optical transmission system. Rather, the present invention can be applied to any wired or wireless transmission system. The receiver device of the proposed system can be implemented in discrete hardware or based on software routines for controlling signal processors at the reception side.

The invention has been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

Although the present invention has been described with reference to specific features and embodiments thereof, it is evident that various modifications and combinations can be made thereto without departing from the spirit and scope of the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. An apparatus for receiving data signals in a multi-channel optical transceiver, the apparatus comprising:
    a receiver (Rx) adapted to process data signals of a plurality of MI channels received from a plurality of M channels of one or more transmitters (Txs), each channel of the MI channels having a respective baud rate (fB), wherein:
    the receiver (Rx) has a single master channel, remaining channels of the MI channels being slave channels;
    the master channel of the receiver (Rx) has a highest baud rate (fBmax) amongst the plurality of MI channels, the slave channels having a baud rate (fB) equal to or lower than the highest baud rate (fBmax) of the master channel; and
    each channel of the receiver (Rx) amongst the master channel and the slave channels comprises a first interpolator (I1) and a timing recovery (TR) circuit adapted to control a sampling phase of the first interpolator (I1), wherein each channel of the receiver (Rx) comprises:
    an automatic gain control (AGC) circuit adapted to adjust an analog data signal to an input of an analog-to-digital converter (ADC) through a control of a bias signal (DC) of the analog data signal and an amplitude of the analog data signal, and
    a transfer function compensator (TFC) circuit adapted to process a digital data signal from the ADC by compensating for a limited bandwidth of optical and electrical components of the multi-channel optical transceiver, the processed digital data signal being provided to an input of the first interpolator (I1).

2. The apparatus of claim 1, wherein the timing recovery (TR) circuit comprises:
    a first circuit adapted in a first phase to obtain a first timing control signal to control a phase and frequency of an oscillator of the master channel;
    a selection circuit adapted in a second phase following the first phase to select a first and second finite impulse response filters amongst a plurality of selectable finite impulse response filters and to calculate coefficients of a first and second filters in order to obtain an adjusted first and second filters; and
    a second circuit adapted in a third phase following the second phase to obtain the sampling phase of the first interpolator (I1) using the selected first and second finite impulse response filters and the adjusted first filter, and to obtain a second timing control signal using the selected first and second finite impulse response filters and the adjusted first and second filters to control the phase and frequency of the oscillator of the master channel.

3. The apparatus of claim 2, wherein the plurality of M1 channels is controlled by an identical clock signal (Rx-clk) generated by the oscillator of the master channel.

4. The apparatus of claim 1, wherein the timing recovery (TR) circuit comprises:
    a selection circuit adapted in a phase to select a first and second finite impulse response filters amongst a plurality of selectable finite impulse response filters and to calculate coefficients of a first and second filters in order to obtain an adjusted first and second filters; and a circuit adapted in a subsequent phase to obtain the sampling phase of the first interpolator (I1) using the selected first and second finite impulse response filters and the adjusted first filter.

5. The apparatus of claim 4, wherein the plurality of M1 channels is controlled by an identical clock signal as a reference clock signal (Refclk), the reference clock signal (Refclk) being generated to have a higher frequency than the highest frequency of each clock signal amongst the plurality of M1 channels.

6. The apparatus of claim 1, wherein each channel of the receiver (Rx) further comprises:
  a maximum-likelihood sequence estimation (MLSE) equalizer adapted to equalize, at an adjusted sampling phase, input samples into decoded data based on a performance estimation using a quality parameter (CMQ) linearly proportional to a bit error rate (BER) of an output of the MLSE equalizer and based on a sampling phase adjustment (SPA) using a probability of most critical error events.

7. The apparatus of claim 6, wherein the MLSE equalizer operates in a blind mode starting from starting channel models (SCMs) stored in a starting channel model list (SCML) device.

8. The apparatus of claim 7, wherein the MLSE equalizer comprises:
  an MLSE decoder adapted to decode, at the adjusted sampling phase, the input samples into the decoded data by starting with the stored SCM that is selected to have a lowest quality parameter (CMQ);
  a branch metric computation (BMC) circuit adapted to control the MLSE decoder and update a corresponding channel using the input samples of the MLSE decoder and the decoded data output from the MLSE decoder;
  a sampling phase selection (SPS) circuit adapted to determine a sampling phase estimation value at different sampling phases using the input samples of the MLSE decoder and the decoded data output from the MLSE decoder and adapted to select the sampling phase corresponding to the highest sampling phase estimation (BSPE) value; and
  a sampling phase adjustment (SPA) circuit adapted to adjust the selected sampling phase (BSPE) into the adjusted sampling phase (SBSPE).

9. The apparatus of claim 8, wherein each channel of the receiver (Rx) comprises: a forward error corrector (FEC) adapted to reduce errors in the decoded data output from the MLSE decoder.

* * * * *